United States Patent
Kwan

(10) Patent No.: US 11,206,183 B2
(45) Date of Patent: *Dec. 21, 2021

(54) NETWORK PROTOCOL METHOD FOR MESH CAPABILITY IN NARROW-BAND WIRELESS NETWORKS

(71) Applicant: Synap Technologies Ltd., Shatin (HK)

(72) Inventor: Thomas Kwan, Tai Po (HK)

(73) Assignee: Synap Technologies Limited., Shatin (HK)

( * ) Notice: Subject to any disclaimer, the term of this patent is extended or adjusted under 35 U.S.C. 154(b) by 191 days.

This patent is subject to a terminal disclaimer.

(21) Appl. No.: 16/508,405

(22) Filed: Jul. 11, 2019

(65) Prior Publication Data

US 2021/0014115 A1    Jan. 14, 2021

(51) Int. Cl.
H04L 12/24 (2006.01)
H04L 12/44 (2006.01)
H04W 72/04 (2009.01)
H04L 29/08 (2006.01)
H04W 84/18 (2009.01)

(52) U.S. Cl.
CPC .......... *H04L 41/0816* (2013.01); *H04L 12/44* (2013.01); *H04L 67/1063* (2013.01); *H04W 72/0446* (2013.01); *H04W 72/0453* (2013.01); *H04W 84/18* (2013.01)

(58) Field of Classification Search
None
See application file for complete search history.

(56) References Cited

U.S. PATENT DOCUMENTS

| 7,089,099 B2 | 8/2006 | Shostak et al. |
| 7,496,078 B2 | 2/2009 | Rahman |

(Continued)

FOREIGN PATENT DOCUMENTS

| WO | WO 0126327 | 4/2001 |
| WO | 2019070619 A1 | 4/2019 |

OTHER PUBLICATIONS

IEEE Std 802.15.4-2011, 4.5.3 Frame structure, Local and Metropolitan Area Networks—Part 15.4, p. 14, Copyright 2011 IEEE.

(Continued)

*Primary Examiner* — Ranodhi Serrao
(74) *Attorney, Agent, or Firm* — Saile Ackerman LLC; Stephen B. Ackerman; Billy Knowles

(57) ABSTRACT

A narrow-band wireless data network includes a central provisioning server that is configured for providing command and control data to the network, to retain the mesh-tree structure of the network, and to manage and retain all sensor data and new connection requests. A gateway device is connected to the central provisioning server for communicating with the network through a first and a second radio receiver/transmitter that is configured to send and receive data on at least one frequency channel. Multiple device nodes that control and communicate with associated sensor devices for collecting sensor data. The device nodes interpret and execute commands transmitted from the gateway device or other device nodes on the network addressed to individual device nodes. The commands are executed with no acknowledgment.

26 Claims, 22 Drawing Sheets

(56) References Cited

U.S. PATENT DOCUMENTS

| | | | | |
|---|---|---|---|---|
| 7,746,838 | B2* | 6/2010 | Twitchell, Jr. | G06Q 10/0832 370/338 |
| 7,830,850 | B2* | 11/2010 | Twitchell, Jr. | H04W 84/22 370/338 |
| 7,940,719 | B2* | 5/2011 | Twitchell, Jr. | H04Q 9/00 370/328 |
| 8,654,782 | B2 | 2/2014 | Meil et al. | |
| 9,363,651 | B1 | 6/2016 | daCosta | |
| 9,730,078 | B2 | 8/2017 | Nixon et al. | |
| 9,730,100 | B2 | 8/2017 | Dacosta | |
| 10,142,122 | B1 | 11/2018 | Hill et al. | |
| 2009/0104902 | A1* | 4/2009 | Twitchell, Jr. | H04W 84/22 455/422.1 |
| 2009/0135843 | A1 | 5/2009 | Veillette | |
| 2009/0161642 | A1* | 6/2009 | Twitchell, Jr. | H04B 1/38 370/338 |
| 2009/0181623 | A1* | 7/2009 | Twitchell, Jr. | G06Q 10/087 455/73 |
| 2010/0144383 | A1* | 6/2010 | Berger | G06Q 50/265 455/521 |
| 2010/0150122 | A1* | 6/2010 | Berger | H04W 4/90 370/338 |
| 2010/0260087 | A1* | 10/2010 | Twitchell, Jr. | G06Q 10/087 370/311 |
| 2011/0235627 | A1* | 9/2011 | Wang | H04W 4/20 370/338 |
| 2012/0197988 | A1 | 8/2012 | Leppanen et al. | |
| 2018/0049161 | A1 | 2/2018 | Lee et al. | |
| 2018/0302911 | A1 | 10/2018 | Aijaz et al. | |
| 2021/0051461 | A1* | 2/2021 | Deixler | H04W 4/70 |

OTHER PUBLICATIONS

IEEE Std 802.15.4-2011, 5.2 MAC frame formats, Low-Rate Wireless Personal Area Networks (LR-WPANS), p. 57, Copyright 2011 IEEE.

"IEEE 802.15.4: A Developing Standard for Low-Power Low-Cost Wireless Personal Area Networks," by Jose A. Gutierrez et al., IEEE Network, Sep./Oct. 2001, pp. 12-19.

ZigBee Specification Document 053474r20, Chapter 1: ZigBee Protocol Overview, pp. 1-16, Copyright 2007-2012 ZigBee Standards Organization.

"On-Demand LoRa: Asynchronous TDMA for Energy Efficient and Low Latency Communication in IoT," by Rajeev Piyare et al., MDPI, Sensors 2018, Nov. 2018, 3718, doi: 10.3390/s18113718, pp. 1-22.

"A Performance Comparison of Different Topologies for Wireless Sensor Networks," by Akhilesh Shrestha et al., 2007 IEEE Conference on Technologies for Homeland Security, May 16-17, 2007, pp. 280-285.

"The WK-recursive pyramid: An efficient network topology," by M. Hoseiny Farahabady et al., Proceedings of the 8th International Symposium on Parallel Architectures, Algorithms and Networks (ISPAN'05), IEEE Computer Society, 6 pages.

"A Survey on Wireless Mesh Neworks: Architecture, Specifications and Challenges," by Mohammad Eslami et al., 2014 IEEE 5th Control and System Graduate Research Colloquium, Aug. 11-12, 2014, pp. 219-222.

"Hierarchical Mesh Tree Protocol for Efficient Multi-hop Data Collection," by Verotiana H. Rabarijaona et al., 2014 IEEE Wireless Communications and Networking Conference (WCNC), Apr. 6-9, 2014, pp. 2008-2013.

"Monitoring a Large-Area IoT Sensors Using a LoRa Wireless Mesh Network System: Design and Evaluation," by Huang-Chen Lee et al., IEEE Transactions on Instrumentation and Measurement (vol. 67, Issue: 9, Sep. 2018), pp. 2177-2187.

Home Networking with IEEE 802.15.4: A Developing Standard for Low-rate Wireless Personal Area Networks, by Ed Callaway et al., IEEE Communicaitons Magazine, Aug. 2002, pp. 70-77.

"A Routing Protocol for LoRA Mesh Networks," by Daniel Lundell et al., Lund University, 2018 IEEE 19th International Symposium on "A World of Wireless, Mobile and Multimedia Networks" (WoWMoM), Jun. 12-15, 2018, 14 pages.

European Search Report, Application No./Patent No. 20160291.9-1216, Applicant: Synap Technologies Ltd., dated Sep. 29, 2020, 11 pages.

* cited by examiner

| Bits: 0-2 | 3 | 4 | 5 | 6 | 7-9 | 10-11 | 12-13 | 14-15 |
|---|---|---|---|---|---|---|---|---|
| Frame Type | Security Enabled | Frame Pending | AR | PAN ID Compression | Reserved | Dest. Addressing Mode | Frame Version | Source Addressing Mode |

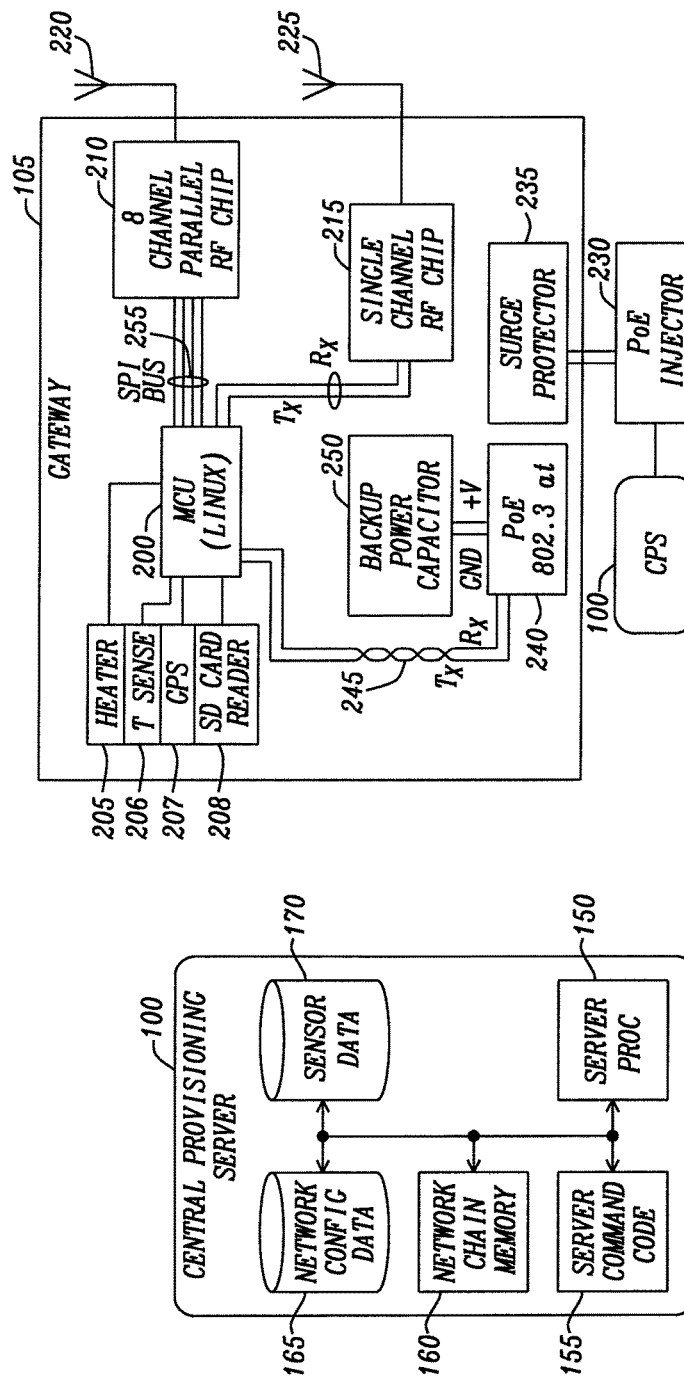

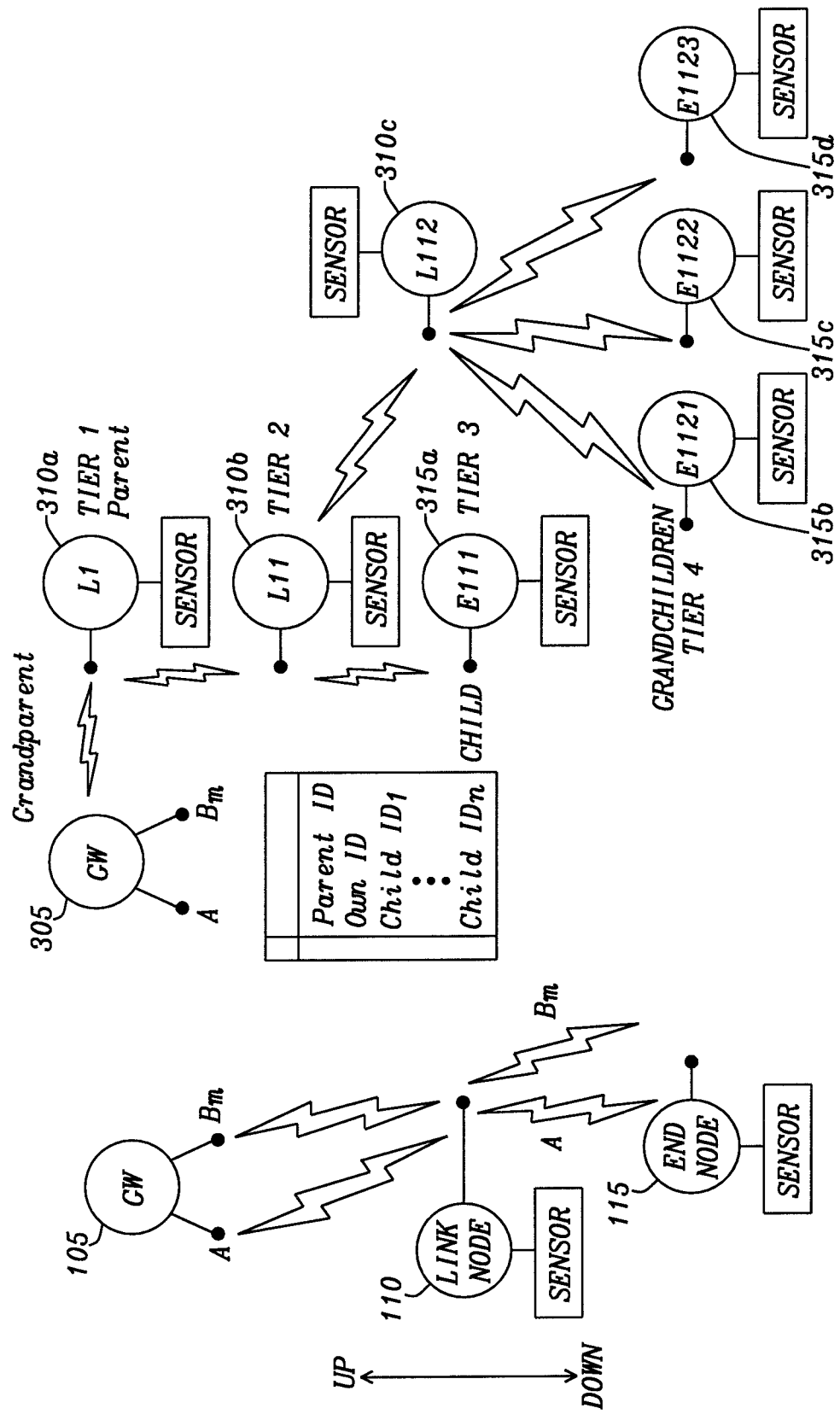

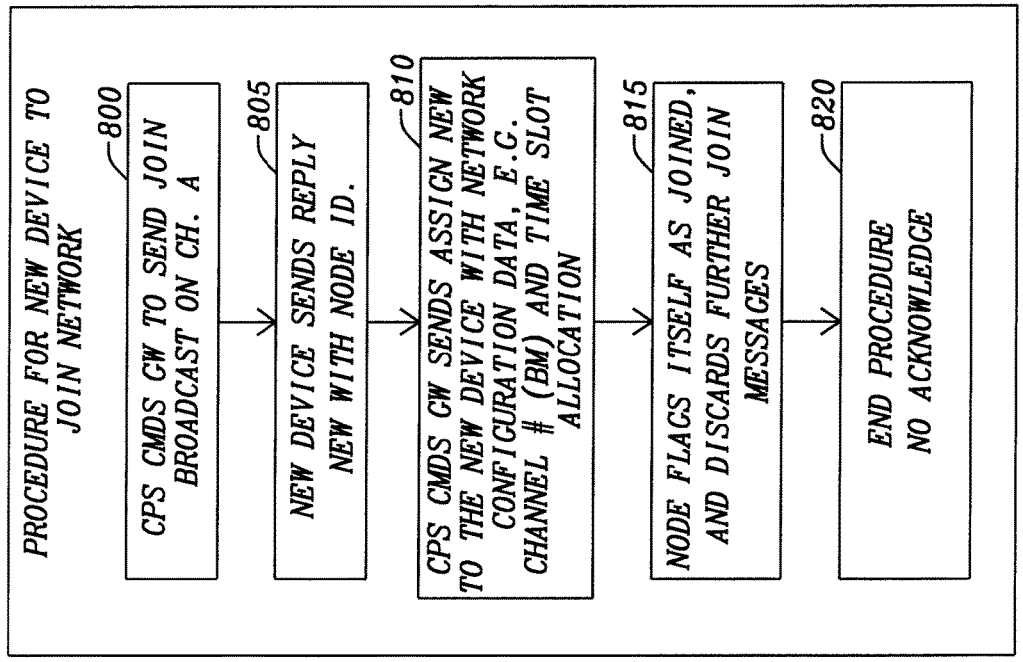
FIG. 14B
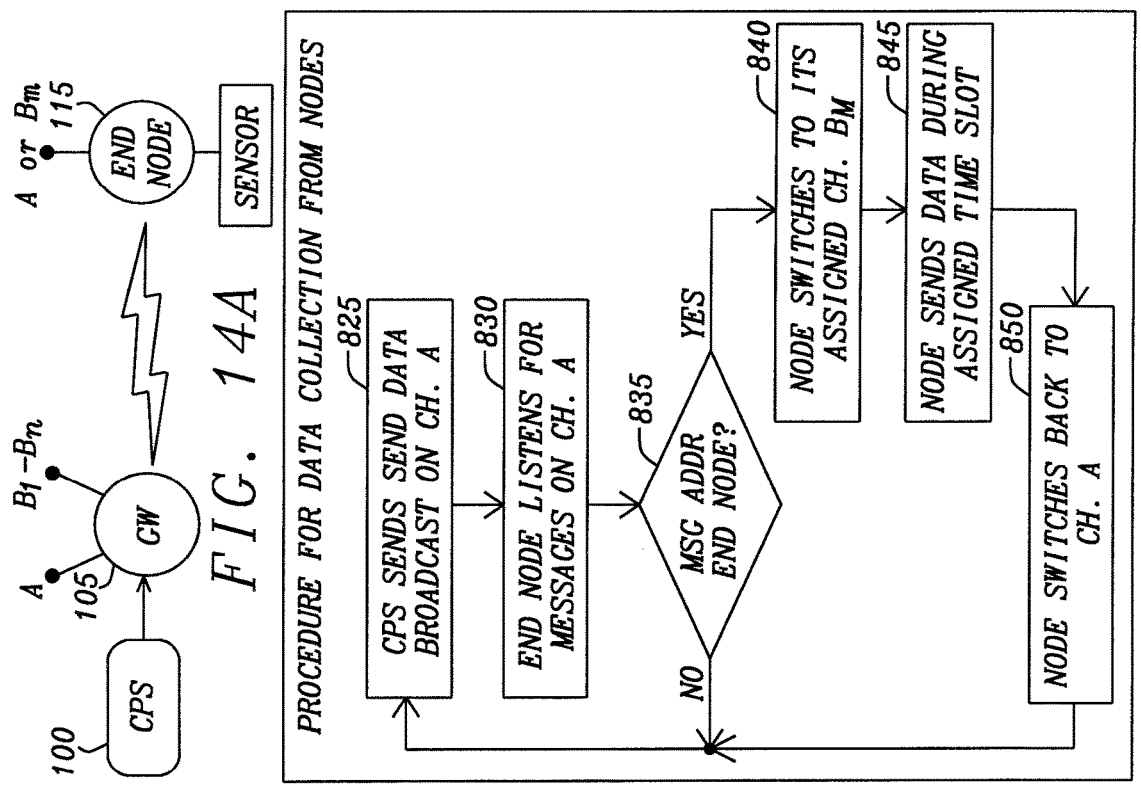
FIG. 14A
FIG. 14C

NETWORK PROTOCOL METHOD FOR MESH CAPABILITY IN NARROW-BAND WIRELESS NETWORKS

RELATED PATENT APPLICATIONS

"Network Protocol for Mesh Capability in Narrow-Band Wireless Networks," U.S. Pat. No. 10,560,322, Issue Date Feb. 11, 2020, assigned to the same assignee as this invention, and herein incorporated by reference in its entirety.

TECHNICAL FIELD

This disclosure relates generally to network configuration. More particularly, this disclosure relates to configuring recursive mesh-tree networks. Even more particularly, this disclosure relates to a communication protocol for autonomously configuring the recursive mesh-tree networks.

BACKGROUND

A sensor network is an interconnected network of components that sense or measure events in the physical world. These components provide sensor elements that include electric and magnetic field sensors; radio-wave frequency sensors; optical sensors, electro-optic sensors, and infrared sensors; radars; lasers; location/navigation sensors; seismic and pressure-wave sensors; environmental parameter sensors (e.g., wind, humidity, heat); and biochemical, national security-oriented sensors. The detected phenomena are digitized and retained in electronic memory and then upon command transmitted over a wireless network to a central processing system.

The sensor elements are low-cost low-power untethered multifunctional nodes that are connected to a central sink node. Some of these networks are cellular technologies such as narrow-band Internet of things (NB-IoT) and a long range wide area network (LoRa/LoRaWAN), and low power wide area networks (LPWAN) such as those constructed by Sigfox of Labège, France. The cellular technologies do not have the needed meshing capability to extend coverage beyond the base station's range. They also have limitations on customizing security features into their communication.

Other networks are internet protocol based structures such as the wireless smart utility network (Wi-SUN), low-rate wireless personal area networks (LR-WPANs), and Zigbee a low-cost, low-power-consumption, two-way, wireless communications standard. The ZigBee standard is a specification for communication in a wireless personal area network (WPAN) for the implementation of the "Internet of things", as published as the ZigBee Specification, Document 053474r20 Sep. 7, 2012, ZigBee Alliance, Inc. San Ramon, Calif. 94583. Networks such as ZigBee have a stack architecture of which two of the stacks (Media Access Control, and Physical Layer) comply with the IEEE 802.15.4 technical standard (IEEE Standard 802.15.4TM-2011, IEEE, New York, N.Y. 10016-5997 USA, Sep. 5, 2011.

These network structures have mesh functionality, but their radios may not offer the best coverage range compared to their cellular radio counterparts. These IP-based technologies also require either a pre-installation staging process or field configuration. The system setup process can be challenging for electrical technicians and power meter field installation personnel.

FIG. 1A is a diagram of a star-structured network 15 such as used in a network implementing the Zigbee standard. The ZigBee standard provides a simple networking layer and standard application profiles that can be used to create interoperable node elements. In the configuration of FIG. 1a, the star network 15 is formed of fully functional devices FFD and reduced function devices RFD. At least one of the fully functional devices FFD may be designated as a personal area network (PAN) coordinator. The PAN Coordinator FFD-PC is in wireless communication with the gateway device 10 that is in turn in communication with a central computer system 5. In some implementations, the gateway device 10 is integrated within the central computer system 5 and in other implementations, the central computer system 5 is remotely connected through another network protocol such as ethernet or an internet protocol to the gateway device 10.

FIG. 1B is a diagram of a peer-to-peer structured network 30 such as used in a network implementing the Zigbee standard. In the peer-to-peer network 30, each of the fully functional devices FFD is wirelessly in communication with the other fully functional devices FFD. One of the fully functional devices FFD is designated as the PAN coordinator FFD-PC and is in communication with the gateway device 25. In turn, the gateway device 25 is in communication with the central computer system 20, as described above. Any reduced function device RFD connects as a leaf device to one of the fully functional devices FFD because reduced function devices RFD are not allowed to communicate with other fully functional devices FFD.

The ZigBee standard permits other more complex network structures that are known in the art such as a cluster tree network (not shown). The cluster tree network is a special case of the peer-to-peer network 30 in which most devices are fully functional devices FFD. The reduced function devices RFD connect to a cluster tree network as a leaf device at the end of a branch as described above. Any fully functional devices FFD may become a PAN coordinator FFD-PC and provide synchronization services to other fully functional devices FFD or reduced function devices RFD or other PAN Coordinators FFD-PC. Only one of these PAN Coordinators FFD-PC is the overall PAN Coordinators FFD-PC. The overall PAN Coordinators FFD-PC may assume the position as the overall PAN Coordinators FFD-PC because it has greater computational resources than any other device in the PAN.

FIGS. 2A and 2B are a diagram of the message protocol for the physical layer (PHY) protocol data unit (PPDU) and the medium access control (MAC) for the IEEE 802.15.4 technical standard as used in the Zigbee standard. In FIG. 2A, the PPDU structure includes a synchronization header SHR, a physical layer header PHR, and a physical layer payload PSDU. The synchronization header SHR is structured to aid receiver algorithms related to automatic gain control (AGC) settings, antenna diversity selection, timing acquisition, coarse and fine frequency recovery, packet and frame synchronization, channel estimation, and leading edge signal tracking for ranging.

The PHR header conveys information necessary for the successful decoding of the packet by the receiver. The PHR contains information about the data rate used to transmit the PSDU, the duration of the current frame's preamble, and the length of the frame payload. Additionally, six parity check bits are used to further protect the PHR against channel errors.

The PSDU is the physical layer payload and contains the MAC header MHR, the MAC payload, and the MAC footer MFR. The MAC Header MHR is shown in FIG. 2B and contains the frame type; security status; a frame pending field indicating additional data is to follow; an acknowledgement request field that specifies whether an acknowledgment is required from the recipient device on receipt of a data or MAC command frame; a PAN identification compression specifying whether the MAC frame is to be sent containing only one of the PAN identifier fields when both source and destination addresses are present; a destination and source addressing mode; and a frame version.

In applications, where the device nodes of the network are formed by large numbers of sensors where it is impractical to set up a large number of base stations to provide direct wireless coverage, the sensors only need to send small amounts of data intermittently for instance 50-100 bytes every 5 minutes up to once per day, the network structures such as Zigbee and other implementations of the IEEE802.15.4 standard are inefficient and require either a pre-installation staging process or field configuration. The system setup process can be challenging for electrical technicians and power meter field installation personnel.

SUMMARY

An object of this disclosure is to provide a network protocol for remotely turning very simple radio devices into radio links, which can retransmit data from other devices of the same or similar type.

Another object of this disclosure is to provide linking of nodes in recursive (mesh-tree structure) such that the link device node performs a simple management task to effect the link formation with the device it connects to.

Further another object of this invention is to provide a timing method for the network that has a self-managed upstream data transmission where the link device node synchronizes the network branch and manages the timing of upstream data transmissions.

To accomplish at least one of these objects, a narrow-band wireless data network includes a central provisioning server that is configured for providing command and control data to the network. Further, the central provisioning server is configured to retain the mesh-tree structure of the narrow-band wireless data network. The central provisioning server is further configured to manage and retain all sensor data and new connection requests. A gateway device is connected either with a wireless or wired connection to the central provisioning server. The wireless connection may be a wideband internet protocol service.

The gateway device comprises a plurality of radio receiver/transmitters. A first radio receiver/transmitter is configured to send and receive data on at least one frequency channel. A second radio receiver/transmitter is configured to simultaneously receive data on one or more of the frequency channels.

The network includes a plurality of device nodes wherein each of the plurality of device nodes is configured to control and communicate with an associated sensor device. Each of the plurality of device nodes comprises a microcontroller device and third radio receiver/transmitter tunable to a plurality of frequency channel, but capable of operating in a single frequency channel at any one time. The microcontroller device is configured for interpreting commands transmitted from the gateway device or other device nodes on the network.

Further, the microcontroller device is configured to communicate with the associated sensor to retrieve and retain the sensor data for transmission through the network to the gateway device to the central provisioning server. Based on the commands received from the third radio transmitter/receiver, the microcontroller device will retrieve the sensor reading from a memory incorporated into the microcontroller and transmit the data such that it is relayed to the central provisioning server for processing.

The central provisioning server has a non-transitory memory apparatus for storing computer program code configured for performing a method for configuring and recording the organization of the device nodes of the network. The non-transitory memory apparatus stores computer program code configured for performing a method for collecting, processing, and storing the sensor data transmitted from the sensor devices. The method for configuring and recording the organization of the device nodes of the network begins with the central provisioning server generating a new device query to be transmitted by the gateway device. If a new device node is sufficiently close to the gateway to receive the new device query, the new device node responds with a new device response including an identification code. The gateway device receives the identification code and transfers it to the central provisioning server. The central provisioning server assigns a parent Identification code, a timeslot designation, and a channel designation. The parent identification code, a timeslot designation, and a channel designation are transferred to the gateway device for transmission to the new device. The gateway device then updates its own child identification list and the new device node becomes designated an end node and a child node of the gateway device. In the verification of the establishment of the new end node of the network, the central provisioning server generates an existence query that is transmitted by the gateway device to the new end node and the new end node responds with its identification code during its timeslot on its designated channel. The gateway device then updates its child identification list.

If the new device node is not sufficiently close to the gateway device to receive the new device query transmission, the end device nodes or link device nodes that exist in the network retransmit the new device query transmission. The new node will receive the new device query transmission and transmit its identification code. At least one of the end device nodes will transmit a parent identification code, a timeslot designation, and a channel designation to the new device. The end node will designate itself a link node and transmit a child listing to the gateway and thus to the central provisioning server.

A method for a new device node to autonomously join the narrow-band wireless data network via an end device node or link device node begins with the new device node when powered up, listening for a new device join query from the gateway. After a set time, if it has not received the new device join query, the new device node sends out its own query signal to let nearby end device nodes or link device nodes know that it is available for joining the network. Any of the end device nodes or link device nodes that receive this query will, after a random delay, send an answer message to let the new device node know that there is an end device node or link device node within range. The new device node registers with the first end device node or link device node that answers its join query that the new device node receives. The new device node discards all subsequent answer messages that it receives from other end device nodes or link device nodes.

The central provisioning server will generate a child existence query to be transmitted by the gateway device for the new link device. The new link device will transmit a child existence query to the new end node and the new end node will respond with an existence response. The new link node will update the number of child nodes and the child identification list of the device nodes that are connected to the new link node. The child identification list is transferred to the gateway node and this to the central provisioning processor for retention.

The method for collecting, processing, and storing the sensor data transmitted from the link device nodes and the end device nodes begins by tuning the link device nodes and the end device into one designated frequency channel. The designated frequency channel is usually the first frequency channel. The central provisioning server generates a data transmission request that is transmitted by the gateway device to the link device nodes and directly connected end device nodes. In turn, the link device nodes broadcast the data transmission request to all the link device nodes or end device nodes associated with the broadcasting link device node. The end device nodes transmit their accumulated data on the designated frequency channel in the designated timeslot to the associated link device nodes. The associated link device node receives the data and resends the data on the designated frequency channel in the designated timeslot for each of the end device nodes and the associated link device nodes. When all the data is received and retransmitted to the gateway device and transferred to the central provisioning server, the link device nodes and the end device nodes reset their third radio transmitter/receivers to the first frequency channel.

BRIEF DESCRIPTION OF THE DRAWINGS

FIG. 4A is a block diagram of the central provisioning server providing command, control, and data storage for the mesh-tree structure of the narrow-band wireless network of this disclosure.

FIG. 4B is a block diagram of the gateway device of the mesh-tree structure of the narrow-band wireless network of this disclosure.

FIG. 5 is a diagram showing the communication directionality of the mesh-tree structure of the narrow-band wireless network of this disclosure.

FIG. 6 is a diagram showing the family tree structure of the mesh-tree structure of the narrow-band wireless network of this disclosure.

FIG. 14A is a diagram of a single hop branch within the mesh-tree structure of the narrow-band wireless network of this disclosure.

FIG. 14B is a flowchart of a join operation in the single hop branch within the mesh-tree structure of the narrow-band wireless network of this disclosure.

FIG. 14C is a flowchart of a data collection operation from the sensor device nodes within the mesh-tree structure of the narrow-band wireless network of this disclosure.

DETAILED DESCRIPTION

The network of sensor devices of this disclosure is a recursive mesh-tree network that communicates on a narrow-band wireless radio band. The sensor devices have very simple radio apparatuses that are structured to form links between the sensor devices. Centralized command and control for all processes of the network of sensor devices originate from a cloud server with the exception of alarm functions that originate from the sensor devices in the mesh-tree network.

Network configuration is done by messaging from the cloud-based central provisioning server. The term cloud-based servers refers to a network of remote servers hosted on the Internet to store, manage, and process data, rather than a local server or a personal computer. Links within the network are accomplished by linking sensor devices. Each sensor device node maintains basic device identification information stored in the memory of each of the sensor devices.

The central provisioning system has either a wireless or wired connection to a gateway device. The gateway device is a central wireless device that communicates between the central provision system and the sensor device nodes of the mesh-tree network. The gateway device has more than one radio and is capable of sending and receiving data over at least one channel on one of the radios and is capable of receiving data simultaneously over one or more (or all) of its channels on the other radio.

Figure 1B:
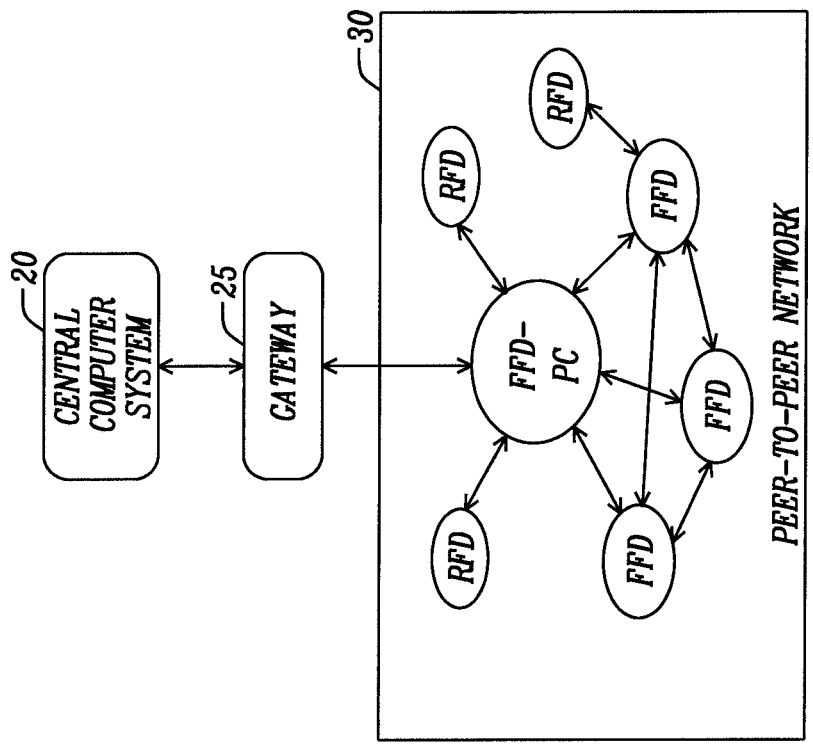
FIG. 1B is a diagram of a peer-to-peer structured network such as used in a network implementing the Zigbee standard of the prior art.
Figure 1A:
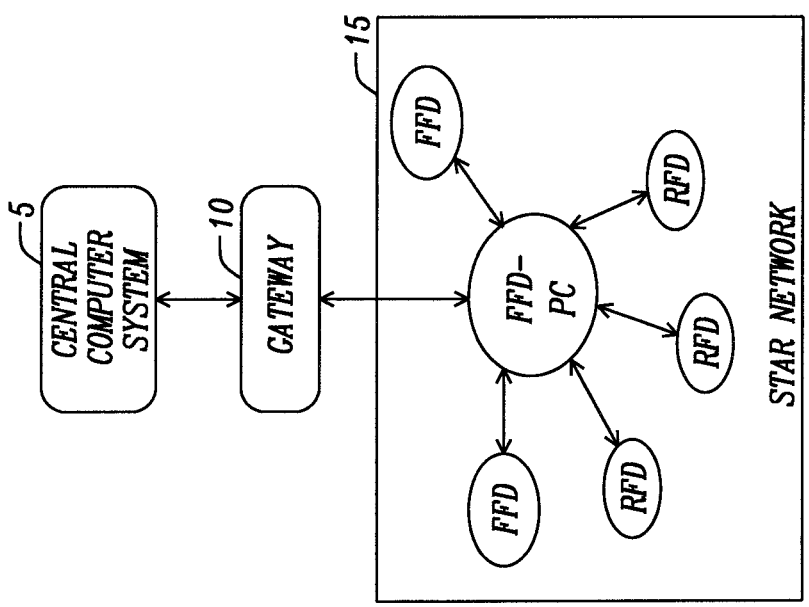
FIG. 1A is a diagram of a star-structured network such as used in a network implementing the Zigbee standard of the prior art.
Figures 2A, 2B:
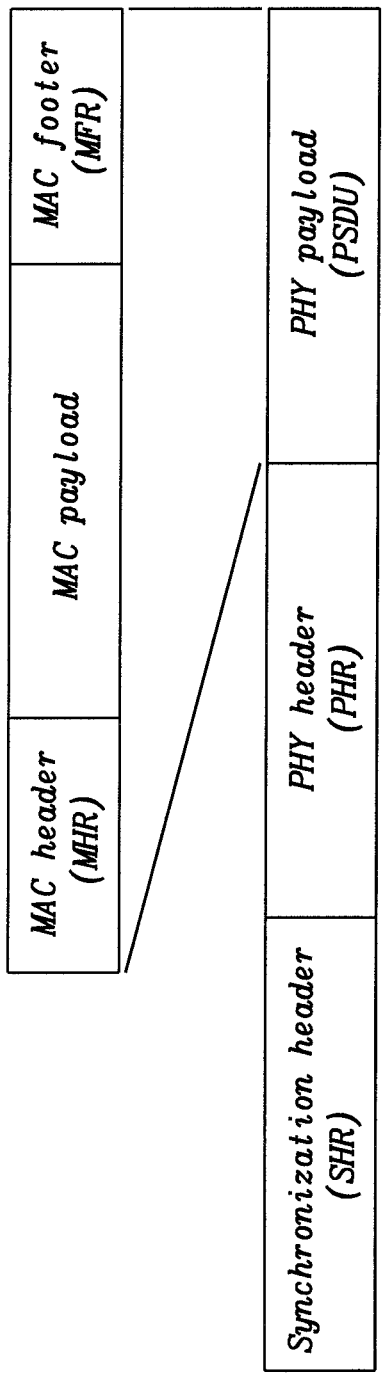
FIGS. 2A and 2B are U) and the medium access control (MAC) for the IEEE 802.15.4 technical standard as used in the Zigbee standard of the prior art.
Figure 3:
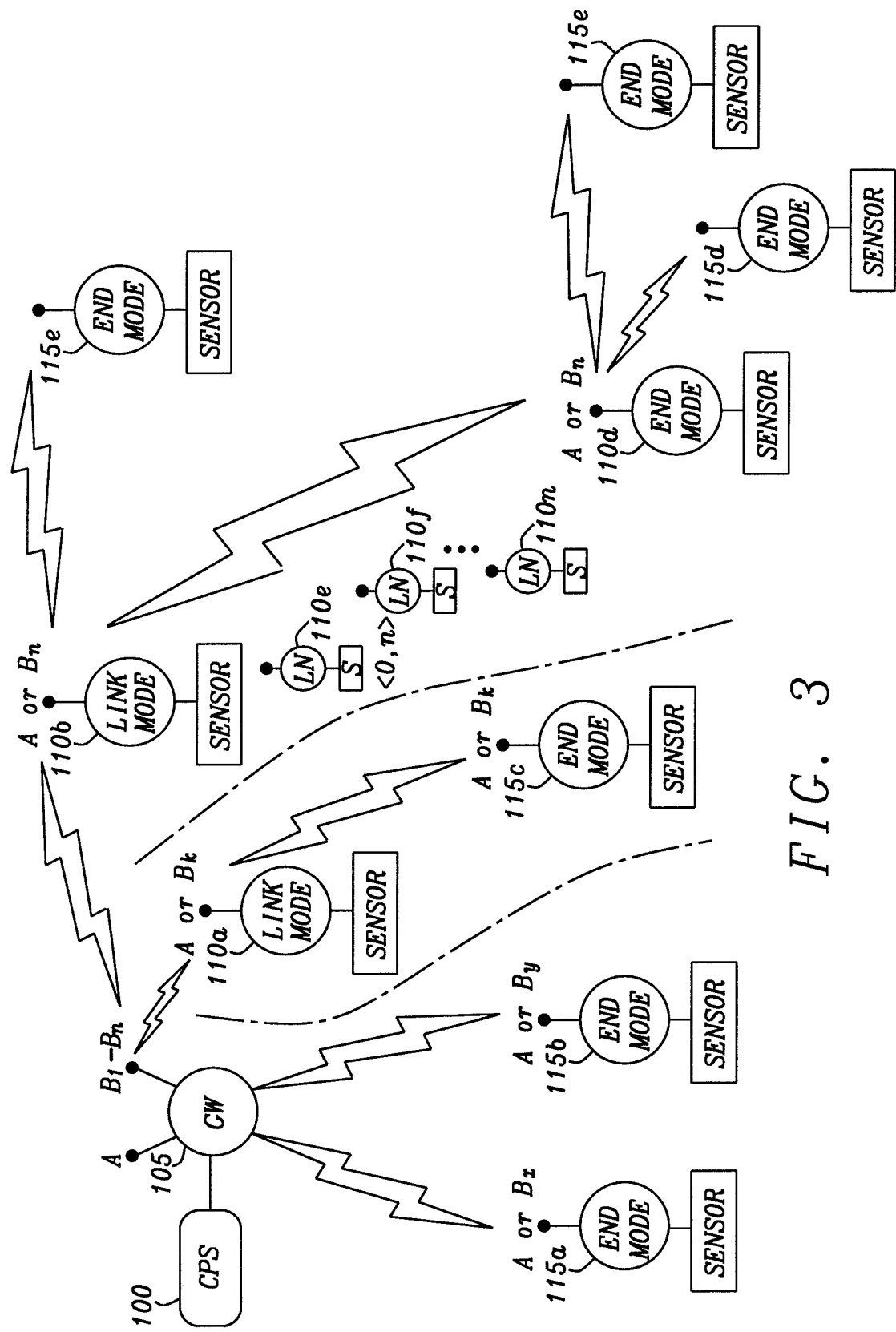
FIG. 3 is a diagram of a configuration of a mesh-tree narrow-band wireless network that functions under the protocol of this disclosure.

FIG. 3 is a diagram of a configuration of a mesh-tree narrow-band wireless network that functions under the protocol of this disclosure. The central provisioning server 100 is in communication with the gateway device 105. FIG. 4A is a block diagram of the central provisioning server 100 providing command and control functions and data storage for the mesh-tree structure of the narrow-band wireless network of this disclosure. The central provisioning server 100 is connected by wire or wirelessly to the gateway device 105. The central provisioning server 100 has a server processor 150 that generates the command and control messages for the mesh-tree narrow-band wireless network. The command and control messages are formed by the execution of the server command code retained in a non-transitory memory 155. The radio frequency channels for communicating with each of the linking and end device nodes are stored in a cloud storage area 165. The linking and end device node addresses and tree interconnection path structure is placed in a cloud storage area 160. When the central provisioning server 100 performs a sensor data query, the gateway device 105 receives the sensor data and transfers it to the server processor 150 of the central provisioning server 100. The server processor 150 transfers the sensor data to the sensor data database located in the cloud storage pool 170. The server processor 150 will aggregate the sensor data as needed and place it back in the sensor data database located in the cloud storage pool 170. The server processor 150 will extract the sensor data and the aggregated sensor data for transfer to other computer systems for other applications.

FIG. 4B is a block diagram of the gateway device 105 of the mesh-tree structure of the narrow-band wireless network of this disclosure. The gateway device 105 has a multiple channel radio integrated circuit 210 capable of sending and receiving data over one or more channels (or all) through the antenna 220. One single channel radio integrated circuit 215 is capable of sending or receiving data simultaneously through a single channel through the antenna 225. The single channel radio integrated circuit 215 transmits all network management and data collection commands ordered from the central provisioning server 100. The network management and data collection commands are transferred from the central provisioning server 100 on a network connection. In some implementations, the network connection is the ethernet that includes a power-over-ethernet injector apparatus 230 for inserting system power for the gateway device. The power-over-ethernet injector apparatus 230 functions according to the "IEEE 802.3 at" standard and provides the ethernet signal containing the network management and data collection commands and the voltage and current necessary for the gateway device to be transferred to the surge protector 235 that protects from an electrical surge on a cable connecting the power-over-ethernet injector apparatus 230 with the gateway device 105. The surge protector 235 is connected to a power-over-ethernet splitter 240 that separates the ethernet data from the voltage and ground. The voltage and ground interconnections are placed between the power over internet splitter 240 and the backup power capacitor 250 which is connected to all the circuits of the gateway device 105. The transmit $T_X$ and receive $R_X$ lines from the power over internet splitter 240 are connected to the microcontroller 200.

Figures 4C, 4D:
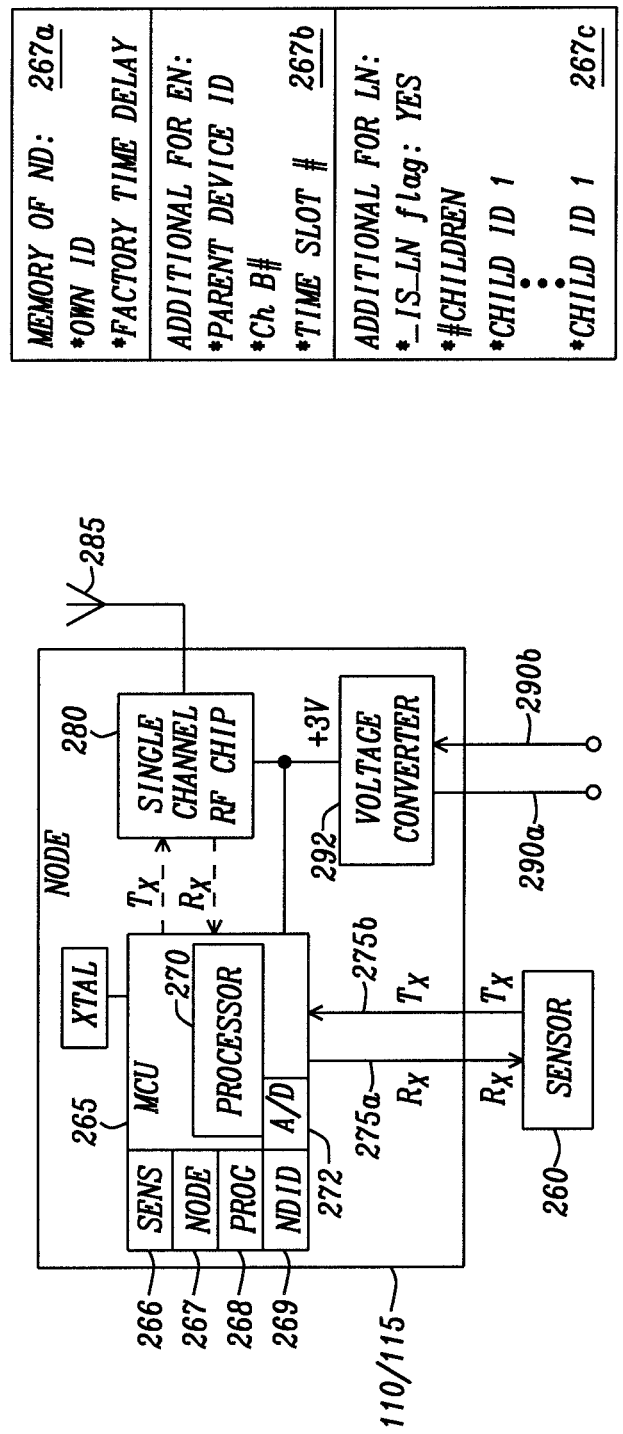
FIG. 4C is a block diagram of the device node of the narrow-band wireless network of this disclosure.
FIG. 4D is a diagram of the node addressing of the mesh-tree structure of the narrow-band wireless network of this disclosure.

FIG. 4C is a block diagram of the end device node 115 and the link device node 110 of the narrow-band wireless network of this disclosure. The end device node 115 or link device node 110 has a microcontroller unit 265 that executes the commands and controls of the command and control messages transmitted by the gateway device 105 from the central provisioning server 100. The microcontroller unit 265 has a memory area that contains volatile and transitory memory such as dynamic random access memory (DRAM) and static random access memory (SRAM) and persistent non-transitory memory such as flash random access memory (flash RAM). The program code that provides the instructions for executing the command and control messages is stored in the flash RAM 268. The permanent addressing for the device node 110, 115, is maintained in a permanent flash RAM area 269 and will contain a unique identification code, a default encryption key, the manufacturer's identification code, a default (random) join response delay time. The link structure of the branches connected to a link device node 110 is stored in the volatile DRAM memory 267. The link structure contains the node identification for the immediately adjacent device nodes 110, 115. Those device nodes 110 that are closer to the gateway device 105 will be a link device node 110 that is referred to as a "parent" node. Those device nodes 110, 115 that are near to the end of a branch of the mesh-tree network will be a child device node 110, 115.

The sensor 260 is connected through the receiving and transmitting connections 275a and 275b to the processor 265. If the sensor 260 is an analog device, the sense signal transmitted on the connection 275b is an analog signal that is transferred to the analog-to-digital converter (ADC) 272 and converted from the analog signal to a digital signal for processing by the processor 270. If the sensor 260 has its own processing circuitry, the sense signal transmitted on the connection 275b will be digital. Any command, control, and timing signals that are to be issued from the node processor 270 are transmitted on the connection 275a. The command signal may be a command to transfer the sensor data at times based on a timing signal. When the sensor 260 transfers sense data to the device node 110, 115, the processor 270 writes the sense data to the sense data location 266 of the memory of the microcontroller 265.

When the central provisioning server 100 of FIG. 3 sends a data query, the encoded message is modulated on a radio signal that is received by the antenna 285. The message is demodulated by the single channel radio frequency receiver/transmitter circuit. 280. The single channel radio frequency receiver/transmitter circuit. 280 transfers the demodulated message with the data query to the microcontroller 265 processor 270. The structure of the demodulated message will be discussed more thoroughly hereinafter. The processor 270 reads the sensor data and composes a return message with the permanent addressing for the device node 110, 115 is maintained in a permanent flash RAM area 269 and the parent link structure of the device node 110, 115 stored in the volatile DRAM memory 267 and the sense data from the sense data location 266 of the memory of the microcontroller 265. The message is then transmitted to the next stage of the mesh-tree network and relayed up the network to the gateway device 105 of FIG. 3 and to the central provisioning server 100.

The power source (not shown) for the device node 110, 115 may be either a battery or the power mains that are connected to the device node 110, 115 through the connectors 290a and 290b to receive either the DC voltage from the battery or the AC voltage from the power mains. The input voltage as applied to the connectors 290a and 290b is applied to a voltage converter 292 to generate the voltage level (+3V) required by the electronic circuitry of the device node 110, 115.

FIG. 4D is a diagram of the node addressing as stored in the flash RAM area 267 of the microcontroller 265 of the mesh-tree structure of the narrow-band wireless network of this disclosure. The flash RAM 267a contains an unassigned device node's 110, 115 identification code, a default encryption key for encrypting all command messages, and a default random join response delay time for minimizing the probability of two device nodes 105 overlapping their initializing transmissions to join the mesh-tree network.

The default encryption key is used for eliminating the need for clear-text messaging, and to some extent protects the network from unauthorized devices. A variety of security measures can, in turn, be taken to protect the default key. An additional operational encryption key is programmed in the flash RAM 267a. The operational encryption key is provided for encrypting all sensor data. This key may be modified at any time, for example before every new data report. Again, there are a number of techniques to generate the operational encryption key. As the sensor data is accessed from the sensor of each of the device nodes 110, 115, the operational encryption key is retrieved from flash RAM 267a. The operational encryption key is cryptographically combined with the accessed sensor data to encrypt the sensor data as it is written to the sense data location 266 of the memory of the microcontroller 265.

The flash RAM area 267b provides information for an end device node 115 that is the last node of a branch of the mesh-tree network structure. The information stored includes the parent device node identification code, a radio channel number B #, and a timeslot number within the radio channel B #.

The flash RAM area 267c provides information for a link device node 110. The information stored includes a link device node flag indicating that the device node is a link node 110, a number of children (end device nodes 115) attached to the link device node 110, and the identification numbers for the children end device nodes 115.

FIG. 5 is a diagram showing the communication directionality of the mesh-tree structure of the narrow-band wireless network of this disclosure. The gateway device 105 is at the top of the mesh-tree network and is in communication with a link device node 110. The link device node 110, in turn, is in communication with the end device node 115. In some implementations of a mesh-tree network, the end device node 115 is referred to as a leaf node, since the node is the outermost node of a branch of the mesh-tree structure. The command and control communication is accomplished on a first frequency channel A. The information and data response is accomplished on one of the multiple second frequency channels B #.

FIG. 6 is a diagram showing the family tree structure of the mesh-tree structure of the narrow-band wireless network of this disclosure. The gateway device 305 is referred to as the grandparent of the mesh-tree network structure. The first tier or parent nodes of sensor device nodes is a link device node 310a. The link device 310b is a child device node to the parent device node 310a to form the second tier. The end device node 315a and the link node 310c form the third tier. The end device node 315a and the link node 310c are the children to the parent link device node 310b. The end device nodes 315b, 315c, 315d are children to the parent link device node 310c. The parent link device node 310a knows only its children, the end device node 315a and the link node 310c and knows nothing of the end device nodes 315b, 315c, 315d. Any of the payload data from the end device nodes 315b, 315c, 315d appears as the payload data from the child link device node 310c to the parent link device node 310b. It should be noted that, as shown in FIG. 3, the gateway device 105 may be connected to an end device node 115a and 115b. In this case, the gateway device is the parent to the child end device node 115a and 115b.

Figure 7:
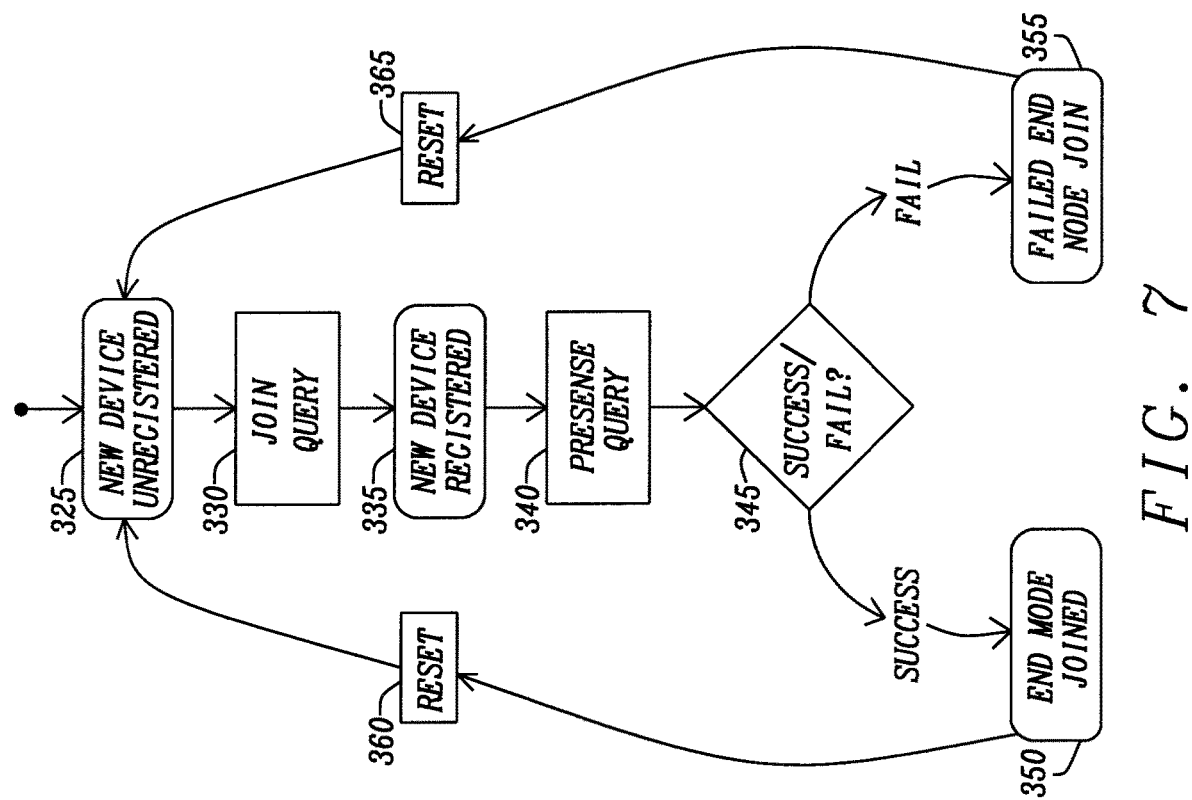
FIG. 7 is a state machine performing the joining of a new device node to the mesh-tree structure of the narrow-band wireless network of this disclosure.

FIG. 7 is a flow chart of a method for the joining of a new device node to the mesh-tree structure of the narrow-band wireless network of this disclosure. The new device node is unregistered (Box 325). The central provisioning server instructs the gateway device to broadcast a new device query wishing to join (Box 330). The new device node registers (Box 335) its node identification code and the gateway device responds with the registered identification code for the new device node, parent identification code, the timeslot of the frequency channel on which the new device node responds to queries, and the frequency channel that the new device node is to transmit. The central provisioning server then updates its child list with the new device node as an operating end device node. The end device node stores its parent identification code, the channel number on which it is to transmit, and the timeslot at which the transmission is to occur in the volatile DRAM memory 267b.

The central provisioning server then verifies (Box 345) the success of the join request with a presence query transmitted by the gateway device to the new end device node. The new device node responds with a message on its designated channel at its designated timeslot with its identification code and its parent identification code. The gateway device then updates its listing of the child device nodes communicating with it. The join operation is successful and the end device node is joined (Box 350). The process is reset (Box 360) and the process begins again with the central provisioning server instructing the gateway device to broadcast a new device query wishing to join (Box 330). If the gateway device does not receive a response from the new end device node, the join operation of the end device node failed (Box 355) and the process is reset (Box 360) and the process begins again with the central provisioning server instructing the gateway device to broadcast a new device query wishing to join (Box 330).

Figure 8:
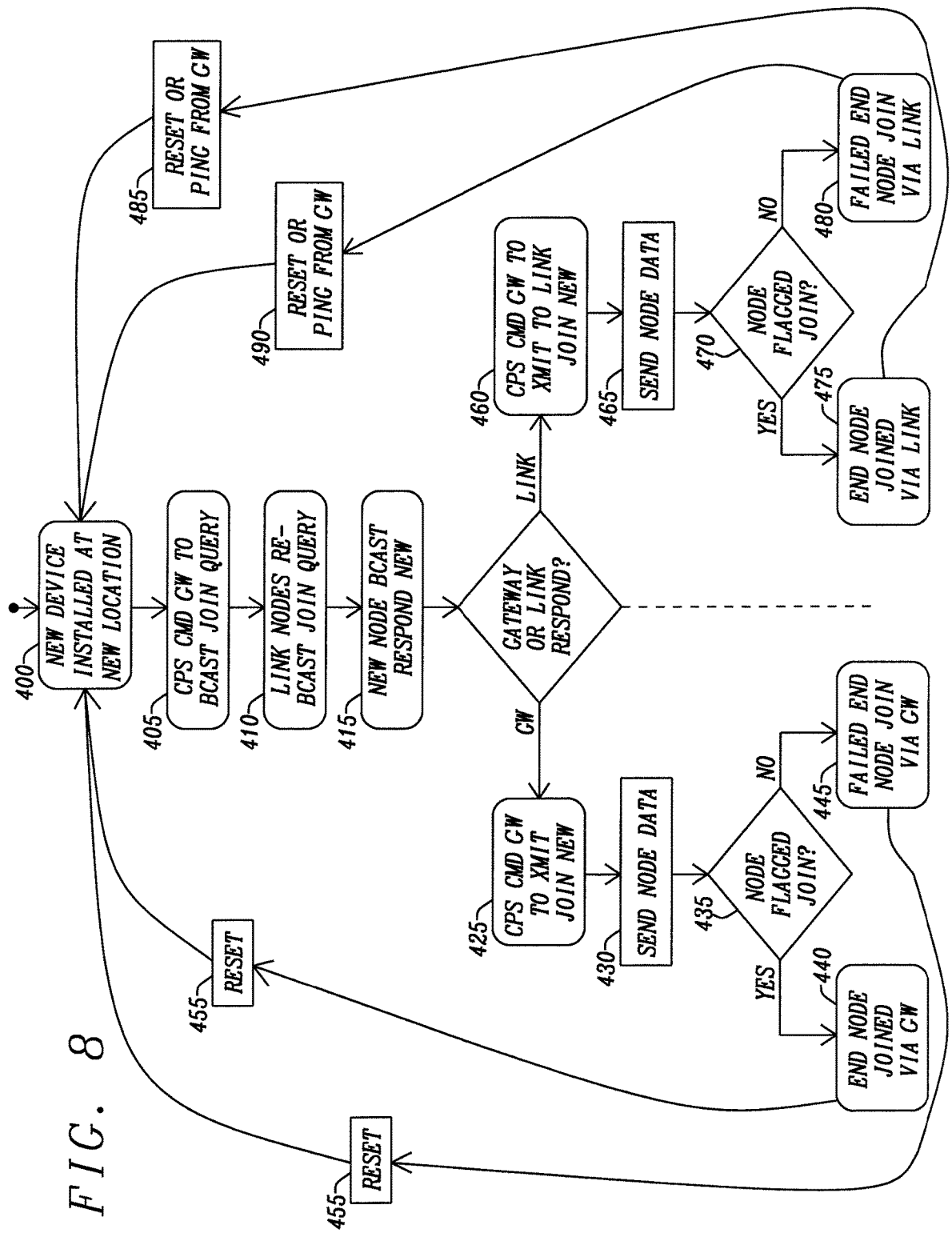
FIG. 8 is a state machine performing the joining of a new device node to the gateway device or a link device node of the mesh-tree structure of the narrow-band wireless network of this disclosure.

FIG. 8 is a flow chart for a method for the joining of a new device node to the gateway device or a link device node of the mesh-tree structure of the narrow-band wireless network of this disclosure. A new device node is installed (Box 400) at a new location and is to join to the mesh-tree network. Periodically, the central provisioning server commands the gateway device to broadcast (Box 405) a join query on a first frequency channel of the radio communications. The link device nodes re-broadcast (Box 410) the join query on the first frequency channel of the radio communication. The new device node broadcasts (Box 415) its identification code and node identification. The gateway device or the link device node will receive the new node broadcast. The gateway device will determine (Box 420) whether it receives the transmission first or the link device node received the transmission first. If the gateway device receives the new device node transmission, the transmission is sent to the central provisioning server. The central provisioning server then commands the gateway device to transmit (Box 425) a join new message. The new node data is then transmitted (Box 430) to the new device node. The new node data consists of the registered identification code for the new device node, parent identification code (the gateway device), the timeslot of the frequency channel on which the new device node responds to queries and the frequency channel that the new device node is to transmit. The central provisioning server then updates its child list with the new device node as an operating end device node. The end device node stores its parent identification code, the channel number on which it is to transmit, and the timeslot at which the transmission is to occur in the volatile DRAM memory.

The central provisioning server then verifies (Box 435) the success of the join request with a presence query transmitted by the gateway device to the new end device. The new device node responds with a message on its designated channel at its designated timeslot with its identification code and its parent identification code. The gateway device then updates its listing of the child device nodes communicating with it. The join operation is successful and the end device node is joined (Box 440). The process is reset (Box 450) and the process begins again with the central provisioning server instructing the gateway device to broadcast a new device query wishing to join (Box 400). If the join operation is not successful, the process is reset (Box 455) and the process begins again with the central provisioning server instructing the gateway device to broadcast a new device query wishing to join (Box 400).

The gateway device will determine (Box 420) whether it receives the transmission first or the link device node received the transmission first. If the link device node receives the new device transmission first, the link device node transfers the new device node transmission to the gateway device. The gateway device then sends the new device node transmission to the central provisioning server. The central provisioning server then commands the gateway device to transmit (Box 460) a join new message. The new node data is then transmitted (Box 465) to the link device node which then transmits the node data to the new device node. The new node data consists of the registered identification code for the new device node, parent identification code (the link device node), the timeslot of the frequency channel on which the new device node responds to queries and the frequency channel that the new device node is to transmit. The central provisioning server then updates its child list with the new device node as an operating end device node. The end device node stores its parent identification code, the channel number on which it is to transmit, and the timeslot at which the transmission is to occur in the volatile DRAM memory.

The central provisioning server then verifies (Box 470) the success of the join request with a presence query transmitted by the gateway device to the new end device node through the link device node. The new device node responds with a message on its designated channel at its designated timeslot with its link code and its parent identification code. The gateway device then updates its listing of the child device nodes communicating with it. The join operation is successful and the end device node is joined (Box 475). The process is reset (Box 485) and the process begins again with the central provisioning server instructing the gateway device to broadcast a new device query wishing to join (Box 400). If the join operation is not successful, the process is reset (Box 490) and the process begins again with the central provisioning server instructing the gateway device to broadcast a new device query wishing to join (Box 400).

Figure 9:
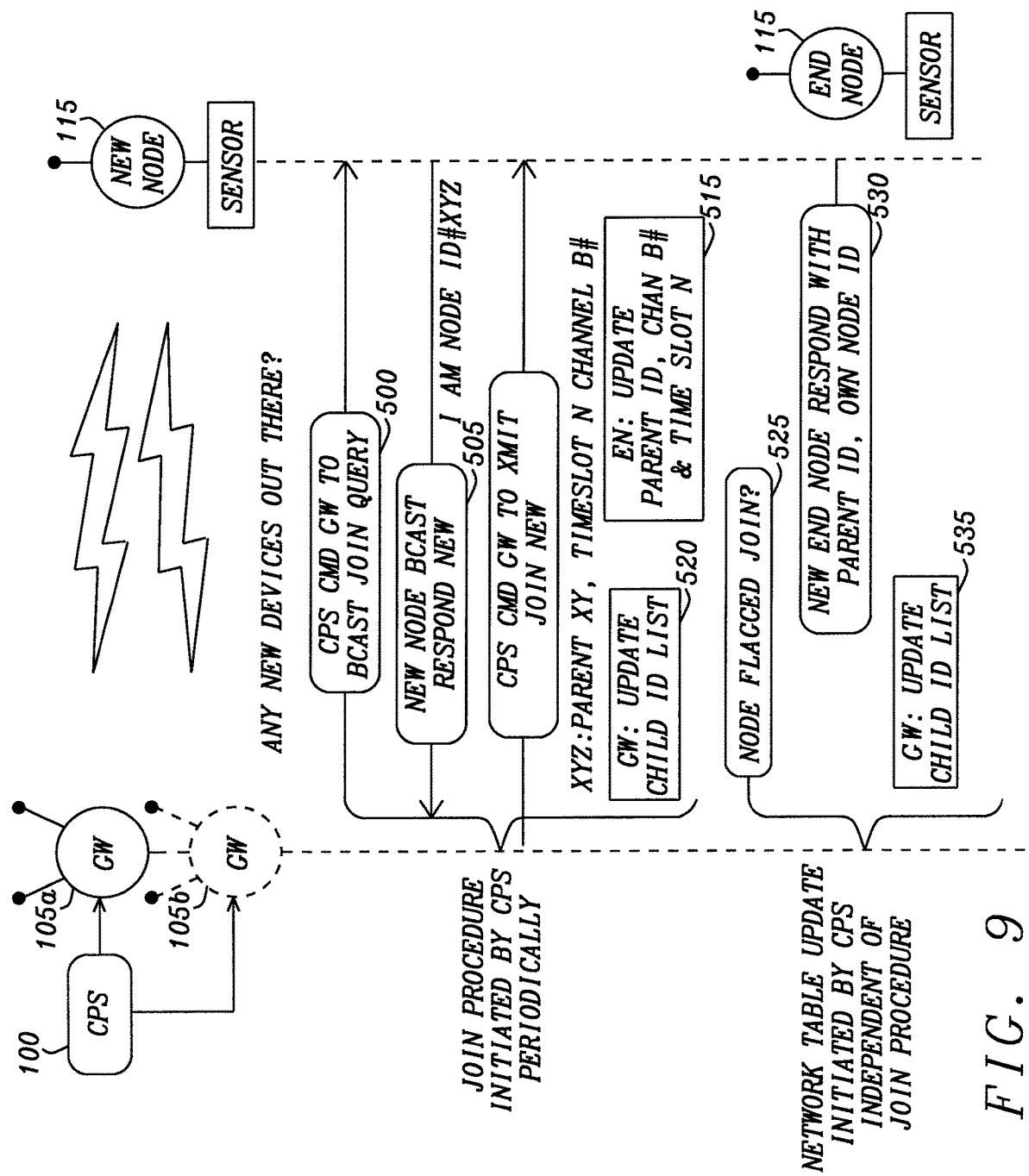
FIG. 9 is a communication flow diagram for the joining of a new device to the gateway of the mesh-tree structure of the narrow-band wireless network of this disclosure.

FIG. 9 is a communication flow diagram for the joining of a new device node 115 to the gateway device 105a of the mesh-tree structure of the narrow-band wireless network of this disclosure. A join procedure is periodically initiated by the central provisioning server 100. The central provisioning server 100 commands the gateway device 105a to broadcast a join query (Box 500) essentially asking if any new devices are available to join the mesh-tree network. When a new device node 115 has been installed and is now available for joining the mesh-tree network, the new device node 115 responds to the join query with a new node query response (Box 505). The new node query response includes the node identification code. The central provisioning server 100 then commands the gateway device to transmit (Box 510) a join new device message that includes the node's network identification code, XYZ, the gateway device identification code XY as the parent node, the nodes transmission timeslot N, and the frequency channel B #. The new device node 115 is now an end device node 115 and updates (Box 515) its memory with the node's network identification code, XYZ, the gateway device identification as the parent node XY, the node's transmission timeslot N, and the frequency channel B #. The central provisioning server 100 updates its child identification code list with the node's network identification code, XYZ, the gateway device identification as the parent node XY.

The join new device message transmission (Box 510) may fail thus causing the new device node 115 to enter a failed node join state. This results in the gateway device 105a in believing that it has a child node but the new device node 115 does not get network parameters and thus doesn't join the network. In order to verify that the new device 115 is in fact joined as the end device node 115, the central provisioning server 100 initiates a network table update independent of the join procedure. The central provisioning server 100 commands the gateway device 105a to transmit (Box 525) a flagged node query asking if the newly joined end device node 115 is, in fact, a member of the mesh-tree network. The newly joined end device node 115 transmits (Box 530) the parent identification code of the gateway device and its own node identification code to the gateway device 105a. The gateway device 105a updates (Box 535) the child identification list and the central provisioning server 100 updates its network table independently of the join procedure.

It is possible to avoid the join verification response for the direct connection of the new device node 115 to the gateway device 105a. In FIG. 9, the transmission (Box 525) of a flagged node query, transmission (Box 530) of the parent identification code, and the gateway device 105a updating (Box 535) the child identification list is not performed. The gateway device 105a and the central provisioning server 100 each have the new device node 115 listed as a child node of the gateway device 105a. The sensor data from the new device node 115 will be transmitted correctly.

When the new device node 115 does not receive the transmission (Box 510) of the join new device message, the new device node 115 join does not occur. The new device node 115 still considered "new" and thus it will react to the next join query (Box 500) broadcast from the first gateway device 105*a* as if join query (Box 500) had not happened. The central provision server 100 now has an earlier record of the new device node 115 in the network table for the gateway device 105*a*. The central provision server 100 simply re-sends the parameters in the network table and the new device node 115 responds correctly. Maintaining the network record avoids multiple entries or wasted timeslots.

If a second gateway device 105*b* is within range, new device node 115 may respond to the second gateway device 105*b* period join query (Box 500) and successfully join the second gateway device 105*b* instead. This means that the first gateway device 105*a* still has new device node 115 in its network table and will request sensor data from the new device node 115 and will receive none. A periodic database clean-up operation in the central provision server 100 removes the erroneous entry from the first gateway device 105*a* network table. This is accomplished by simply checking the timestamps of the received from the sensor of the new device node 115. All the duplicate entries in the tables for the gateway device 105*a* of the node identification code of the new device node 115 are deleted. Any node identification code that is associated with any gateway device (not shown) is also deleted except for the second gateway device 105*b* associated with the latest sensor data report.

Figure 10:
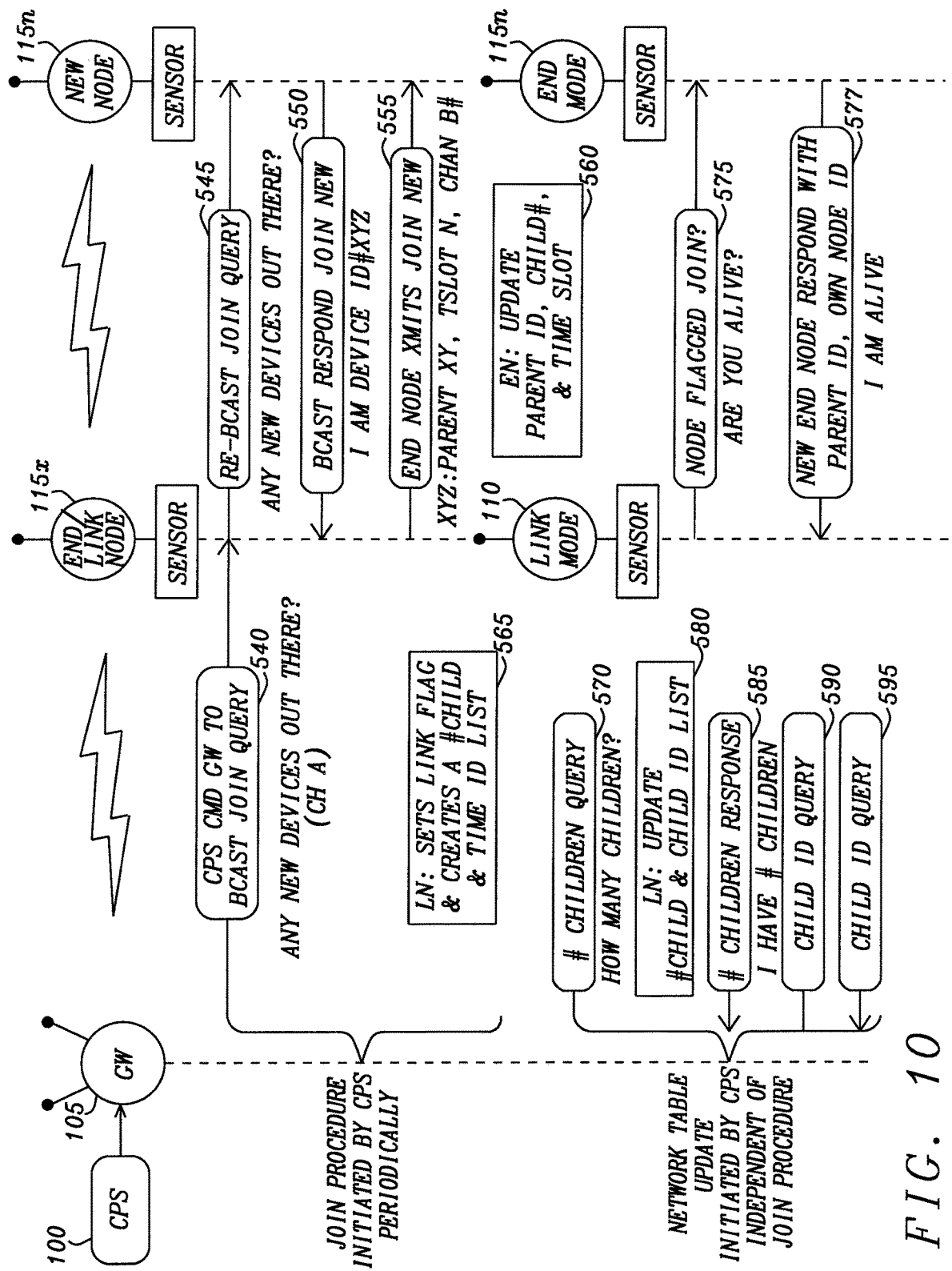
FIG. 10 is a communication flow diagram for the joining of a new device node to an end device node or a link node of the mesh-tree structure of the narrow-band wireless network of this disclosure.

FIG. 10 is a communication flow diagram for the joining of a new device 115*n* to an end device node 115*x* that is then converted to a link node 110 of the mesh-tree structure of the narrow-band wireless network of this disclosure. The join procedure is periodically initiated by the central provisioning server 100, as described above, to command the gateway device 105 to broadcast a join query (Box 540) essentially asking if any new devices 115*n* are available to join the mesh-tree network. The end device node 115*x* re-broadcasts a join query (Box 545) essentially asking if any new devices 115*n* are available to join the mesh-tree network. When a new device node 115*n* has been installed and is now available for joining the mesh-tree network, the new device node 115*n* responds to the join query with a new node query response (Box 550). The new node query response (Box 550) includes the nodes identification code. The end device node 115*x* transmits (Box 555) a join new device message that includes the node's network identification code, XYZ, the parent device node identification code XY as the parent node, the node's transmission timeslot N, and the frequency channel B #. The new device node 115*n* is now an end device node 115*n* and updates (Box 560) its memory with the node's network identification code, XYZ, the gateway device identification as the parent node XY, the node's transmission timeslot N, and the frequency channel B #. The end device node 115*x* sets its link flag to be active and then creates (Box 565) its child identification code list with the node's network identification code, XYZ, the link device node identification as the parent node XY.

The join new device message transmission (Box 555) may fail thus causing the new device node 115*n* to enter a failed node join state. This results in the link device node 110 in believing that it has a child node but the new device node 115 does not get network parameters and thus does not join the network. In order to verify that the new device 115*n* is in fact joined as the end device node 115*n*, the central provisioning server 100 initiates a network table update independent of the join procedure. The central provisioning server 100 commands the gateway device 105 to transmit (Box 570) a number of child nodes query to the link device nodes 110 to determine the number of the child nodes 115*n* linked to the link device node 110. The link node transmits (Box 575) a flagged node query asking if the newly joined end device node 115*n* is, in fact, a member of the mesh-tree network. If the newly joined end device node 115*n* is, in fact, a member of the mesh-tree network then the newly joined end device node 115*n* the transmits (Box 577) the parent identification code of the gateway device and its own node identification code to the gateway device 105 on the designated transmission channel and it assigned timeslot.

The link device node 110 then updates (Box 580) the number of child device nodes, and the child device node identification list. The link node 110 transmits (Box 585) a response with the number of child device nodes 115*n* that the link device node 110 has. The central provisioning server 100 then commands the gateway device 105 to transmits (Box 590) a child node identification query. The link device node 110 then responds with the transmission (Box 595) of its child device node identification list.

Figure 11A:
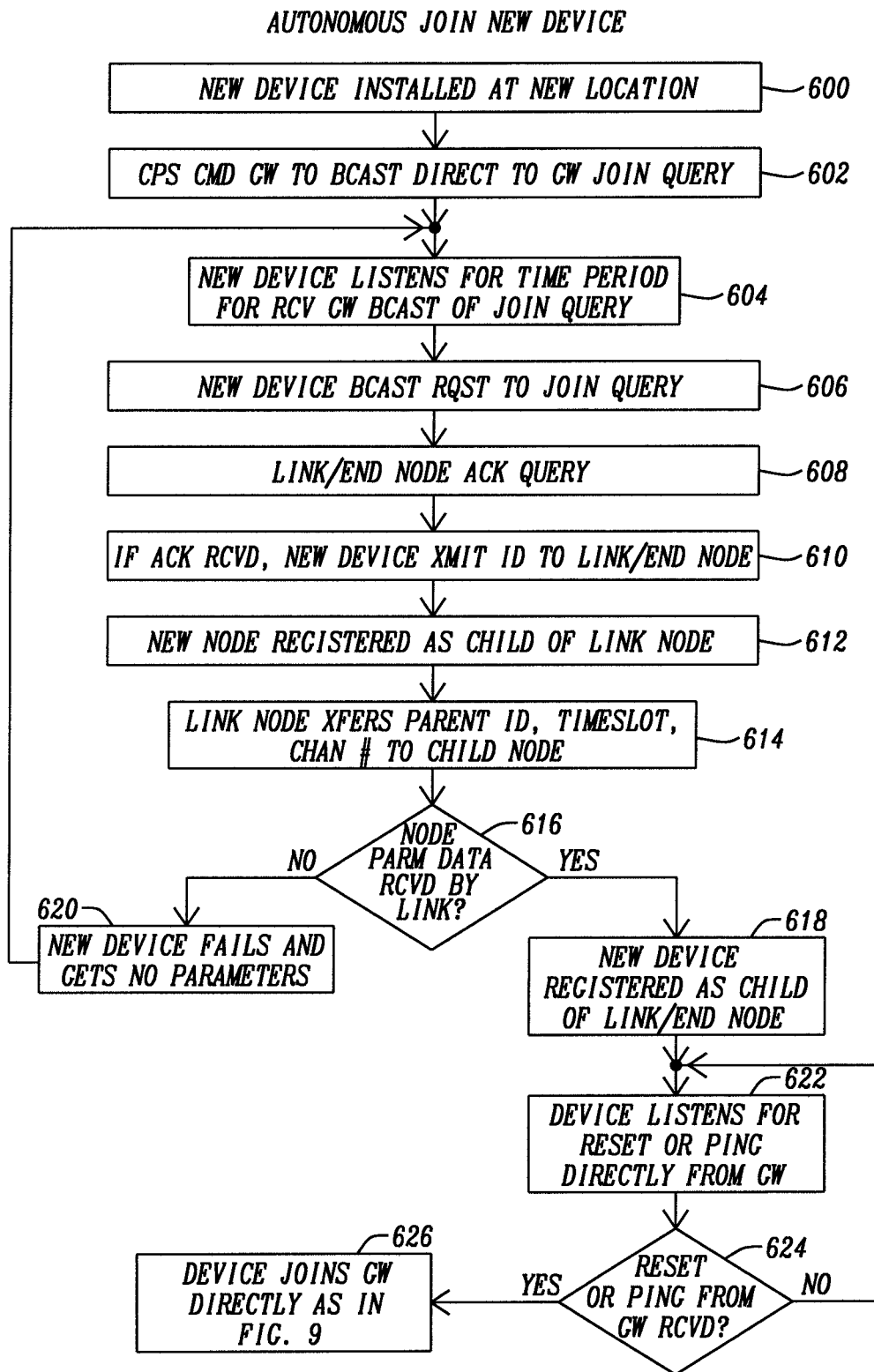
FIG. 11A is a flowchart for a method for a new device node to autonomously join an end device node or link device node of the narrow-band wireless network of this disclosure.

FIG. 11A is a flowchart for a method for a new device node to autonomously join an end device node or link device node of the narrow-band wireless network of this disclosure. A new device node 115*n* is installed (Box 600) at a new location and is to join to the mesh-tree network. Periodically, the central provisioning server 100 commands the gateway device 105 to broadcast (Box 602) a join query on a first frequency channel of the radio communications transmitter/receiver. The new device node listens (Box 604) for a time period to receive the join query on the first frequency channel of the radio communication transmitter/receiver. When the new device node 115*n* does not receive the join query after the time period expires, the new device node 115*n* broadcasts a request to join query (Box 606). Any link device node or any end device node 115*x* will acknowledge the request to join query (Box 608). If the link new device node 115*n* receives the acknowledgment of the request to join query, the new device node 115*n* transmits its device identification code to the link device node or the end device node 115*x* (Box 610). The end device node 115*x* sets its link flag to become a link device node 110. The link device node 110 registers the new device node 115*n* as a child of the link device node 110 with a count of the number of children and a listing of the child identification codes for each child device node 115*n* (Box 612).

The link node then transmits (Box 614) the new node data to the new device node. The new node data consists of the registered identification code for the new device node 115*n*, parent identification code (the link device node 110), the timeslot of the frequency channel on which the new device node 115*n* responds to queries, and the frequency channel that the new device node 115*n* is to transmit.

The central provisioning server 100 then updates its child list with the new device node 115*n* as an operating end device node. The end device node 115*n* stores its parent identification code, the channel number on which it is to transmit, and the timeslot at which the transmission is to occur in the volatile DRAM memory.

The central provisioning server 100 then verifies the success of the join request with a presence query transmitted by the gateway device through the link device node 110 to the new end device node 115*n*. The presence query is a request to verify (Box 616) that the new device node 115*n* has received its node parameters. The new device node transmits its parent identification code and its own device identification code. The link device 110 registers (Box 618) the success of the parameter transfer and declares the new node device 115*n* as a child of the link device node 110.

If the new device node 115*n* fails to receive (Box 620) the node parameters, no node parameters are stored in the new device node 115*n* memory. The node then new device node 115*n* then listens (Box 604) again for the time period for a broadcast from the gateway node 105. The process is continued as described above.

If the new device node 115*n* is registered (Box 618) as a child of the link device node 110, the new device node 115*n* then listens (Box 622) for a reset command or a ping (a join query) from the gateway device 105. If there is no reset command or ping or join query from the gateway device 105, the new device node 115*n* then continues listens (Box 622) for a reset command or a ping (a join query) from the gateway device 105. When the new device node 115*n* receives the reset or ping or join query, the new device node 115*n* directly joins the gateway device 105 as described in FIG. 9.

Figure 11B:
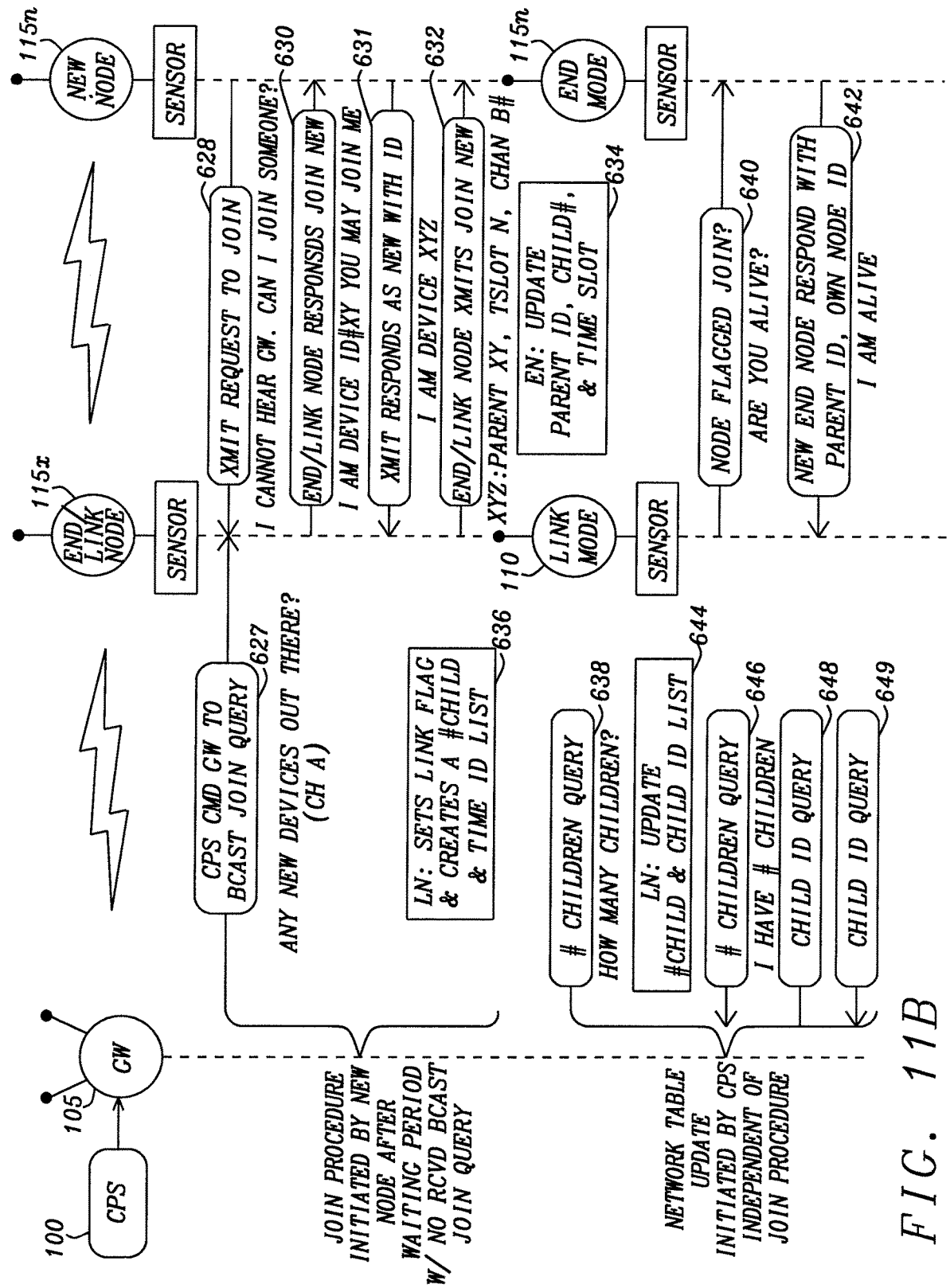
FIG. 11B is a communication flow diagram for the autonomous joining of a new device node to an end device node or a link node of the mesh-tree structure of the narrow-band wireless network of this disclosure.

FIG. 11B is a communication flow diagram for the autonomous joining of a new device node 115*n* to a link node or an end device node 115*n* of the mesh-tree structure of the narrow-band wireless network of this disclosure. The join procedure is periodically initiated by the central provisioning server 100, as described above, to command the gateway device 105 to broadcast a join query (Box 627) essentially asking if any new devices 115*n* are available to join the mesh-tree network. The new device node 115*n* listens for a time period to receive the join query (Box 627) on the first frequency channel of the radio communication transmitter/receiver. When the new device node 115*n* does not receive the join query after the time period expires, the new device node 115*n* broadcasts a request to join query (Box 628). The link device node or end device node 115*x* responds to the join query with a join new query response (Box 630). The join query response (Box 630) includes the nodes identification code. The new device node 115*n* transmits (Box 631) a join new device message that includes the node's network identification code, XYZ. The link device node or end device node 115*x* responds (Box 632) with the parent device node identification code XY as the parent node, the node's transmission timeslot N, and the frequency channel B #. The new device node 115*n* is now an end device node 115*n* and updates (Box 634) its memory with the node's network identification code, XYZ, the gateway device identification as the parent node XY, the node's transmission timeslot N, and the frequency channel B #. The link device node or end device node 115*x* sets its link flag to be active and then creates (Box 636) its child identification code list with the node's network identification code, XYZ, the link device node identification as the parent node XY.

The join new device message transmission (Box 630) may fail thus causing the new device node 115*n* to enter a failed node join state. This results in the link device node 110 in believing that it has a child node but the new device node 115 does not get network parameters and thus does not join the network. In order to verify that the new device 115*n* is in fact joined as the end device node 115*n*, the central provisioning server 100 initiates a network table update independent of the join procedure. The central provisioning server 100 commands the gateway device 105 to transmit (Box 638) a number of child node queries to the link device nodes 110 to determine the number of the child nodes 115*n* linked to the link device node 110. The link node transmits (Box 640) a flagged node query asking if the newly joined end device node 115*n* is, in fact, a member of the mesh-tree network. If the newly joined end device node 115*n* is, in fact, a member of the mesh-tree network then the newly joined end device node 115*n* the transmits (Box 642) the parent identification code of the gateway device and its own node identification code to the gateway device node 105 on the designated transmission channel and it assigned timeslot.

The link device node 110 then updates (Box 644) the number of child device nodes, and the child device node identification list. The link node 110 transmits (Box 646) a response with the number of child device nodes 115*n* that the link device node 110 has. The central provisioning server 100 then commands the gateway device 105 to transmits (Box 648) a child node identification query. The link device node 110 then responds with the transmission (Box 649) of its child device node identification list.

Figure 12:
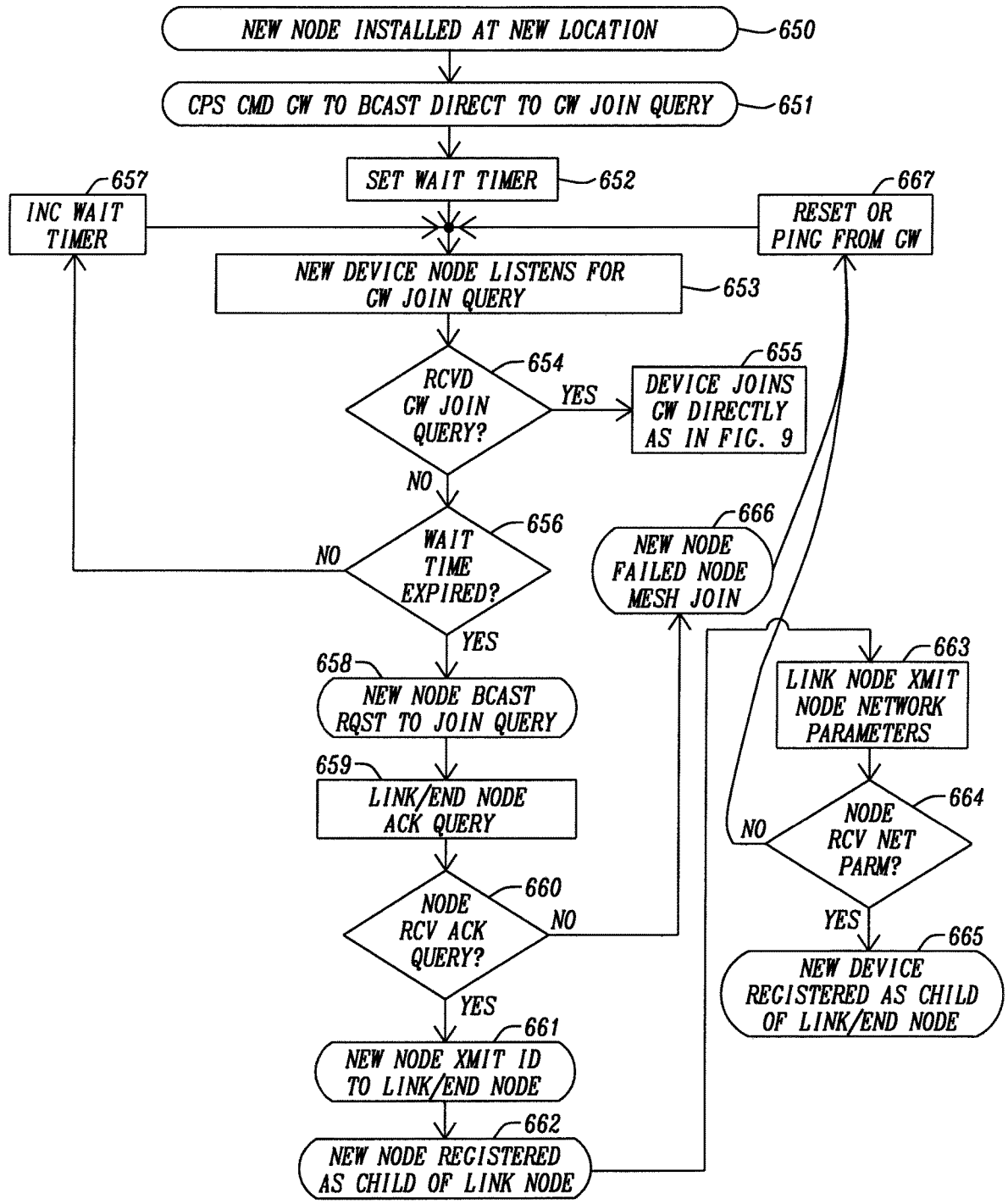
FIG. 12 is a flowchart for performing the autonomous joining of a new device node to an end device node or a link node of the mesh-tree structure of the narrow-band wireless network of this disclosure.

FIG. 12 is a flowchart for performing the autonomous joining of a new device node to an end device node or a link node of the mesh-tree structure of the narrow-band wireless network of this disclosure. A new device node 115*n* is installed (Box 650) at a new location and is to join to the mesh-tree network. Periodically, the central provisioning server 100 commands the gateway device 105 to broadcast (Box 651) a join query on a first frequency channel of the radio communications transmitter/receiver. Once the new device node 115*n* is activated and operating, it sets (Box 652) a wait timer. The new device node 115*n* listens (Box 653) for a time period to receive the join query from the gateway device 105 on the first frequency channel of the radio communication transmitter/receiver. The new device node 115*n* then determines (Box 654) if the join query is received. If it has been received, the new device node 115*n* directly joins the gateway device 105 as described in FIG. 9.

If the join query has not been received, the timer is examined (Box 656) to determine if the timer has expired. If the timer has not expired, the timer is incremented (Box 657) and the new device node 115*n* listens (Box 653) to receive the join query from the gateway device 105.

When the new device node 115*n* does not receive the join query from the gateway device 105 after the time period expires, the new device node 115*n* broadcasts a request to join query (Box 658). Any link device node or any end device node 115*x* will acknowledge the request to join query (Box 659). The new device node 115*n* will determine (Box 660) if new device node 115*n* receives the acknowledgment of the request to join query. If the new device node 115*n* receives the acknowledgment of the request to join query, the new device node 115*n* transmits (Box 661) its device identification code to the link device node or the end device node 115*x*. The link device node or end device node 115*x* set (Box 662) its link flag to become a link device node 110.

The link node 110 then transmits (Box 663) the new network data parameters to the new device node 115*n*. The new node data parameters consist of the registered identification code for the new device node 115*n*, parent identification code (the link device node 110), the timeslot of the frequency channel on which the new device node 115*n* responds to queries, and the frequency channel that the new device node 115*n* is to transmit. The new device node 115*n* determines (Box 664) that the network data parameters have been received and stored. If the network data parameters are received, the new device node 115*n* is then registered (Box 665) as a child of the link node device 110.

If the new device node 115*n* does not receive the acknowledgment query, the new device node 115*n* has failed (Box 666) the mesh join or if the new device node 115*n* has not received the network data parameters, the new device node 115*n* either resets or receives a ping or join query from the gateway device server 105. If the new device node 115*n* receives the ping from the gateway device 105, it proceeds with the join process as shown in FIG. 9. If the new device node 115 is reset, it starts listening (Box 653) for the join query from gateway device 105 and continues the process.

Figure 13:
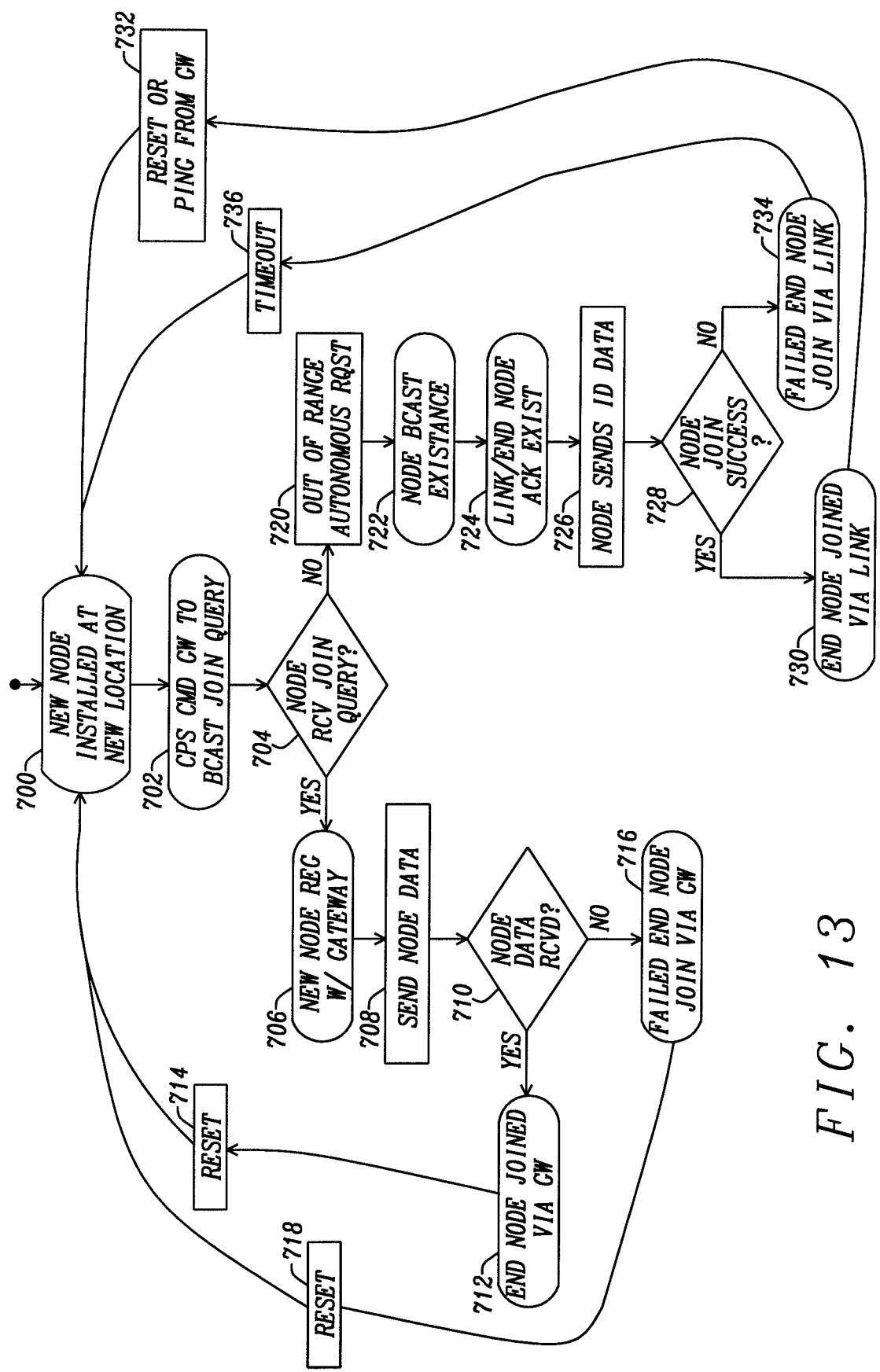
FIG. 13 is a state machine performing the autonomous joining of a new device node to an end device node or a link node of the mesh-tree structure of the narrow-band wireless network of this disclosure.

FIG. 13 is a state machine performing the autonomous joining of a new device node to an end device node or a link node of the mesh-tree structure of the narrow-band wireless network of this disclosure. A new device node is installed (Box 700) at a new location and is to join to the mesh-tree network. Periodically, the central provisioning server commands the gateway device to broadcast (Box 702) a join query on a first frequency channel of the radio communications. The new device node determines (Box 704) that the new device node has received a join query from the gateway device. If the new device node has received the join query, the new device node broadcasts its node identification to register (Box 706) with the gateway device. The gateway device transmits (Box 708) a join new message. The node message provides the node that includes the parent device node identification code, a radio channel number B #, and a timeslot number within the radio channel B #.

The new device node determines (Box 710) if it has received the join new message. If the join new message has been received by the new device node, the gateway device list the new device node as joined (Box 712) and the central provisioning server then updates its child list with the new device node as an operating end device node. The end device node stores its parent identification code, the channel number on which it is to transmit, and the timeslot at which the transmission is to occur in the volatile DRAM memory. If the join new message is not received by the new device node, the new device node has failed (Box 716) the join through the gateway device. The new device node is then reset (Boxes 714 and 718) and the new device node appears and a newly installed node (Box 700) and the process begins again.

If the join query is not received from the gateway device, the new device node is out of range of the gateway device. The new device node begins (Box 720) an autonomous join request. When the new device node does not receive the join query from the gateway device after the time period expires, the new device node broadcasts (Box 722) a request to join query indicating its existence. Any link device node or any end device node will acknowledge (Box 724) the request to join query establishing the existence of the new device node. The new device node transmits (Box 726) its device identification code to the link device node or the end device node. The central provisioning server then verifies (Box 728) the success of the join request with a presence query transmitted by the gateway device to the new end device node. The new device node responds with a message on its designated channel at its designated timeslot with its identification code and its parent identification code. The gateway device then updates its listing of the child device nodes communicating with it. The join operation is successful and the end device node is joined (Box 730). The process is reset or the gateway pings the new device node (Box 732) and the process begins again. If the join operation is not successful, The new device node has failed (Box 734) to join via the end device node or link device node. The process times-out (Box 736) and the process begins again.

FIG. 14A is a diagram of a single hop branch with the central provisioning server 100 communicating with the gateway device 105 and the gateway device 105 communicating with an end device node 115 within the mesh-tree structure of the narrow-band wireless network of this disclosure. FIG. 14B is a flow chart of a join operation in the single hop branch within the mesh-tree structure of the narrow-band wireless network of this disclosure. FIG. 11C is a flow chart of a data collection operation from the end device node 115 with a sensor within the mesh-tree structure of the narrow-band wireless network of this disclosure. Referring to FIG. 11B, the procedure for a new device node 115 joining the mesh-tree structure of the narrow-band wireless network begins with central provisioning server 100 commanding the gateway device 105 to broadcast a join query (Box 600) on a first frequency channel A essentially asking if any new devices 115 are available to join the mesh-tree network. When a new device node 115 has been installed and is now available for joining the mesh-tree network, the new device node 115 responds (Box 605) to the join query with a new node query response. The new node query response includes the nodes identification code. The central provisioning server 100 then commands the gateway device to transmit (Box 610) a join network configuration data that includes the node's network identification code, XYZ, the gateway device identification code XY as the parent node, the nodes transmission timeslot N, and the frequency channel B #to the new device node 115 and updates its memory with the node's network identification code, XYZ, the gateway device identification as the parent node XY, the nodes transmission timeslot N, and the frequency channel B #. The new device node 115 now flags itself (Box 615) as an end device node 115 and discards any further join messages. The procedure ends with no acknowledgment (Box 620).

Referring to FIG. 14C, the procedure for data collection from end device node 115 begins with the central provisioning server 100 commanding the gateway device 105 to broadcast (Box 625) a prepare data instruction on the first frequency channel A. The end device node 115 listens (Box 630) on the first frequency channel A for any message with its node identification code before receiving the message with the prepare data instruction. The end device node 115 evaluates (Box 635) each message for its node identification code. If it does not recognize its own node identification code, the procedure starts again with the central provisioning server 100 commanding the gateway device 105 to broadcast (Box 625) prepare data instruction on the first frequency channel A and the end device node 115 listening (Box 630) on the first frequency channel A for any message with its node identification code. When the end device node 115 recognizes its own identification code, the end device node switches (Box 640) to its designated frequency channel $B_M$. The end device node 115 transmits the sensed data (Box 645) at the end device node's 105 during its assigned timeslot. The device node 115 then switches (Box 650) to the first frequency channel A.

Figure 15:
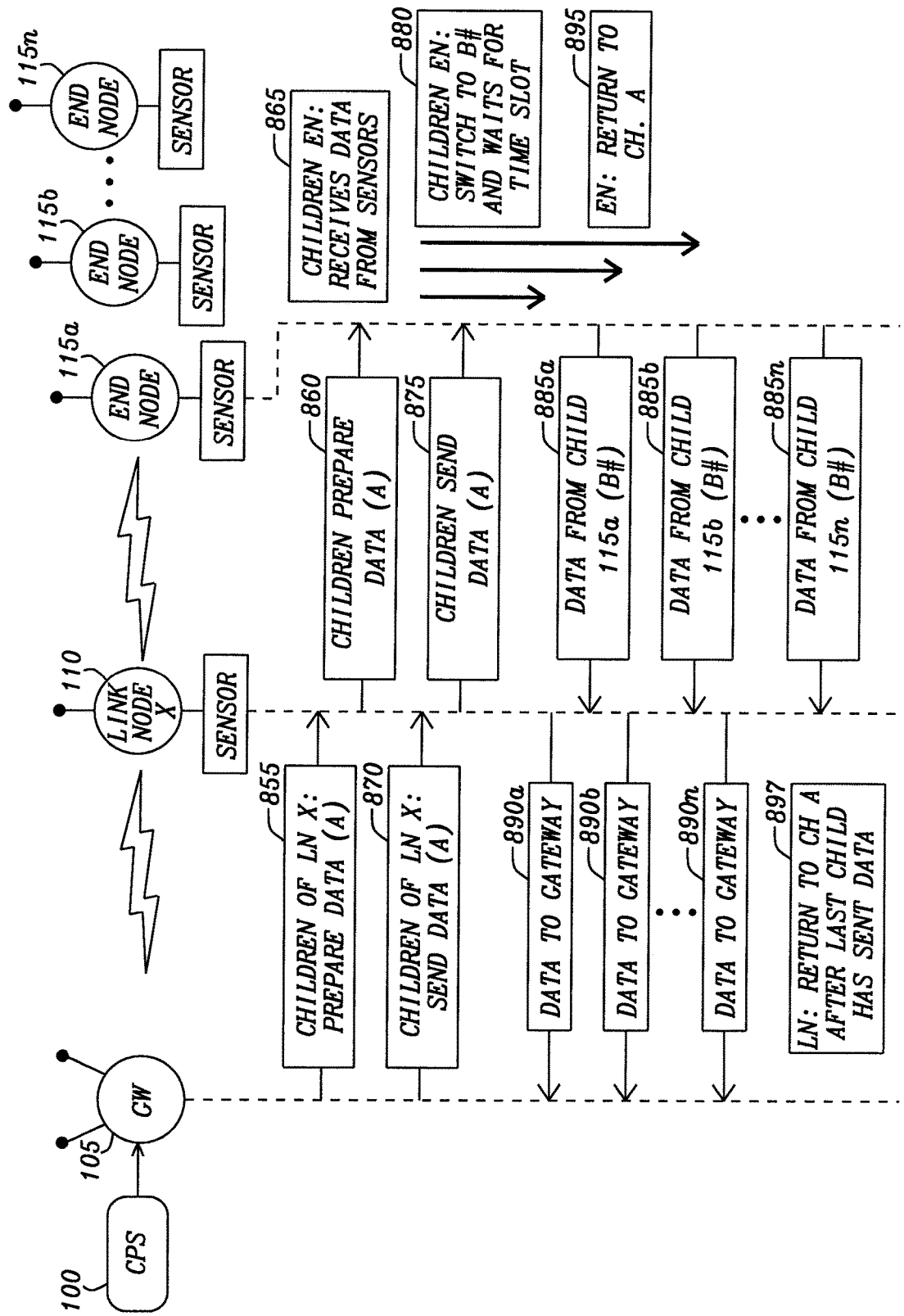
FIG. 15 is a communication flow diagram of a data collection operation within the mesh-tree structure of the narrow-band wireless network of this disclosure.

FIG. 15 is a communication flow diagram of a data collection operation within the mesh-tree structure of the narrow-band wireless network of this disclosure. The communication in the execution of data collection from end device nodes 115a, 115b, . . . 115n begins with the central provisioning server 100 commanding the gateway device 105 to broadcast a prepare data instruction (Box 655) on the first frequency channel A that is addressed to the link device node 110 for its children end device nodes 115a, 115b, . . . 115n. The link device node 110 generates a new message addressed to the children end device nodes 115a, 115b, . . . 115n for the prepare data instruction. The link device node 110 then transmits the message with the prepare data instruction (Box 660) to the children end device nodes 115a, 115b, . . . 115n. The end device nodes 115a, 115b, . . . 115n are listening on the first frequency channel A for any message with their node identification codes. When they identify any message with their identification codes, the end device nodes 115a, 115b, ... 115n will then receive the sensor data (Box 665) from the sensors connected to the end device nodes 115a, 115b, ... 115n. The central provisioning server 100 commands the gateway device 105 to broadcast a send data instruction (Box 670) on the first frequency channel A that is addressed to the link device node 110 for its children end device nodes 115a, 115b, ... 115n. The link device node 110 generates a new message addressed to the children end device nodes 115a, 115b, ... 115n for the send data instruction (Box 675). The end device nodes 115a, 115b, ... 115n switch (Box 680) to its designated frequency channel $B_M$. Each end device node 115a, 115b, ... 115n then transmits the sensed data (Box 685a, 685b, ... 685n) at each of the end device node 115a, 115b, ... 115n during its assigned timeslot. The sensed data is then retransmitted (Box 690a, 690b, ... 690n) by the link device node 110 to the gateway device 105 and then transferred to the central provisioning server 100. The end device nodes 115a, 115b, ... 115n then switch (Box 695) their RF receiver/transmitters to the first frequency channel A and the link device node 110 switches (Box 697) its RF receiver transmitter to the first frequency channel A.

Figure 16A:
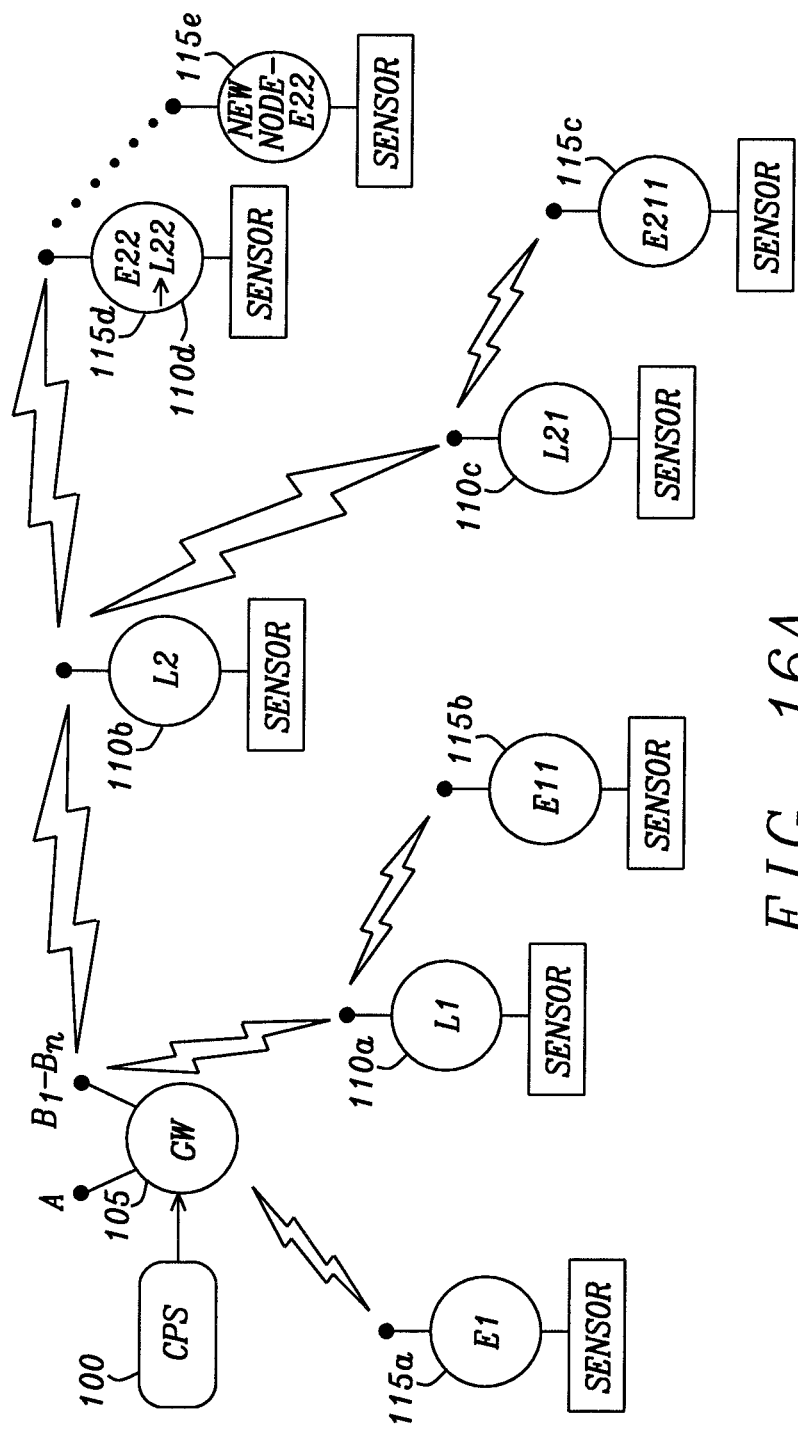
FIG. 16A is a diagram showing the family tree structure of the mesh-tree structure of the narrow-band wireless network of this disclosure during recursive linking.

FIG. 16A is a diagram showing the family tree structure of the mesh-tree structure of the narrow-band wireless network of this disclosure during recursive linking. The central provisioning server 100 communicates with the gateway device 105 either with a wired connection or wireless on a broadband WIFI connection. The gateway device 105 is in communication with the child end device node 115a designated E1. The child end device node 115b communicates with the link device node 110a and is designated E11 indicating the level of the mesh-tree network that the child device node 115b occupies. The gateway device 105 communicates with the child link device nodes 110a and 110b and are respectively designated L1 and L2. The link device nodes 110a is in communication with the link node 110c designated L21, which in turn is in communication with the child end device node 115c and is designated E2111. The link device node is in communication with the end link device node 115d.

Figure 16B:
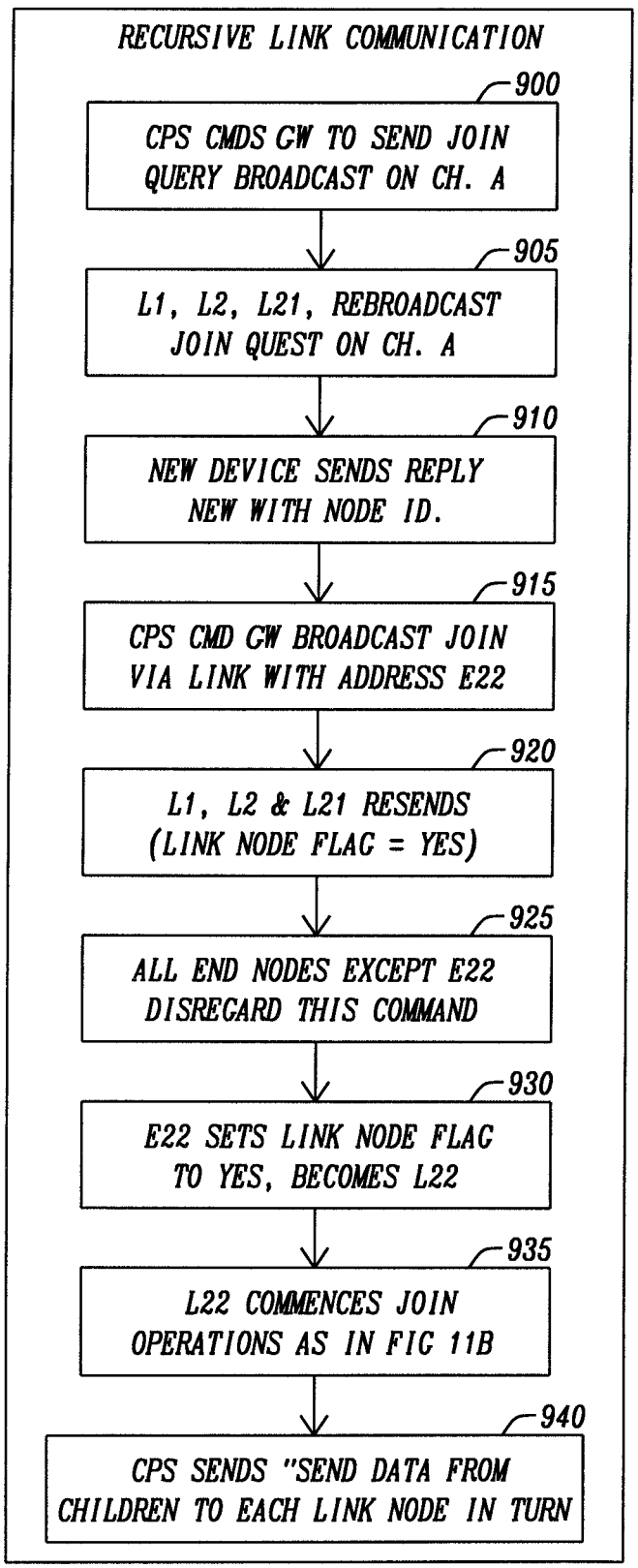
FIG. 16B is a flowchart of the recursive communication within the mesh-tree structure of the narrow-band wireless network of this disclosure.

FIG. 16B is a flowchart of the recursive communication within the mesh-tree structure of the narrow-band wireless network of this disclosure. Periodically, as described above, the central provisioning server 100 commands (Box 700) the gateway device 105 to broadcast a new join query on the first frequency channel A. The link device nodes L1 110a, L2 110b, and L21 110c each rebroadcast (Box 705) the new join query. The new device node 115e responds (Box 710) to the child device node 115d with its node identification code. The central provisioning server 100 then commands the gateway device to broadcast (Box 715) a join through a link device node 110d with the address E22. The link device nodes L1 110a, L2 110b, and L21 110c each rebroadcast (Box 720) the join via the link (Link node flag is equal to yes). All end device nodes E1 115a, E11 115b, E211 115c, with the exception of the end device node E22 115d disregard (Box 725) the join via link command. The end device node E22 115d sets (Box 730) it's link node flag to be equal to "YES" such that the child device node 115d becomes the link device node 110d now designated L22. The link device node 110d now begins (Box 735) the join operation of FIG. 11B and transfers the join new command with the parent identification code, the node identification code, the channel B #and the timeslot within the channel B #to the new child device node 115e. The central provisioning server 100 will broadcast the gateway device server 105 to broadcast (Box 740) a send data command from each of the child device nodes E1 115a, E11 115b, E211 115c, E22 115E, to each link device nodes L1 110a, L2 110b, L21 110c, and L22 110d in turn.

Figure 17A:
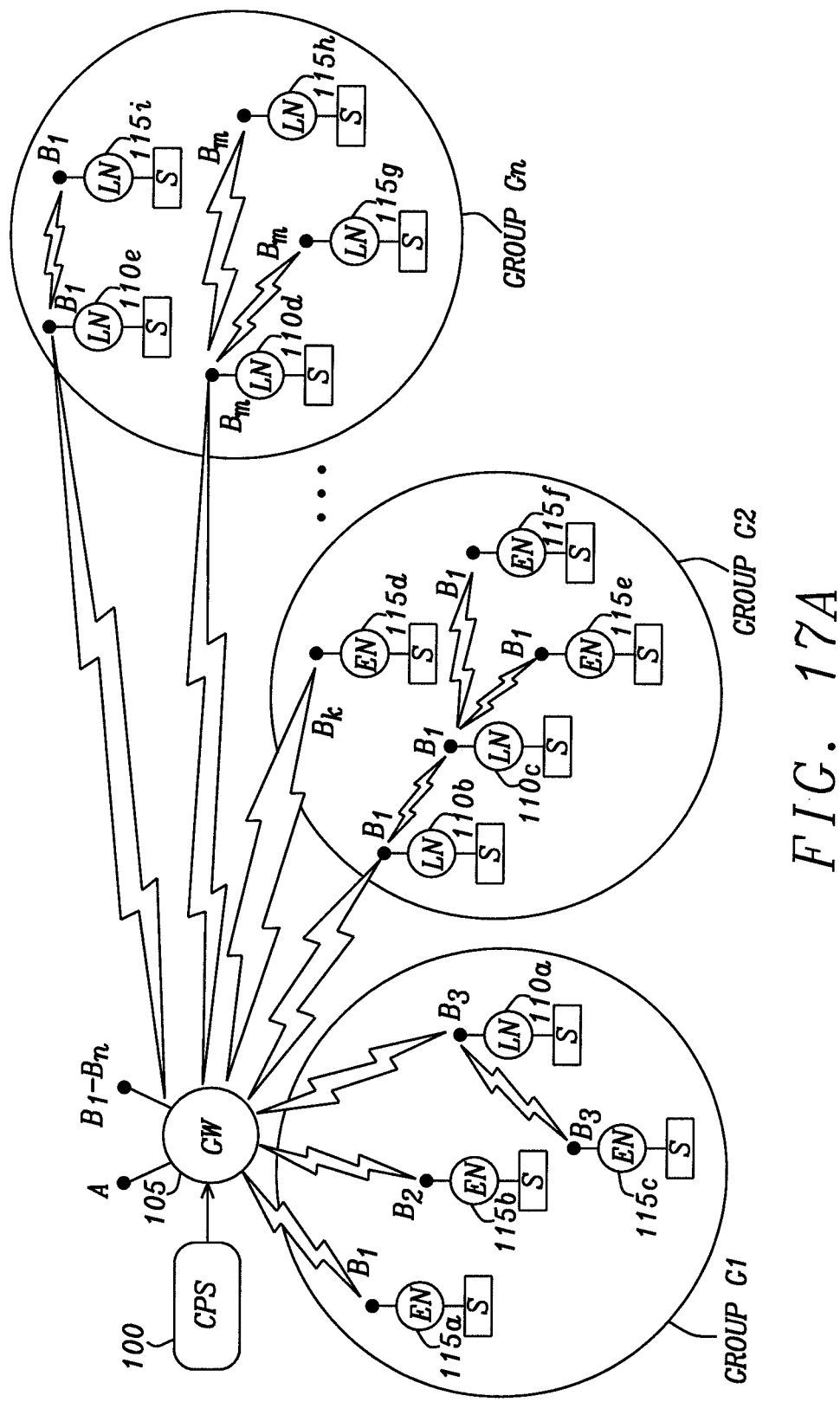
FIG. 17A is a diagram showing the family tree structure of the mesh-tree structure of the narrow-band wireless network of this disclosure demonstrating the channel structure.

FIG. 17A is a diagram showing the family tree structure of the mesh-tree structure of the narrow-band wireless network of this disclosure demonstrating the channel structure. The tree structure of the mesh-tree narrow-band wireless network is divided into groups G1, G2, . . . Gn. The group G1 has the end device nodes 115a and 115b in communication with the gateway device 105. The group G1 has a link node 110a in communication with the gateway device 105. The end device node 115c of group G1 is in communication with the link device node 110a. The group G2 has a link node 110b and an end device node 115d in communication with the gateway device 105. The link device node 110b is in communication with the link device node 110c and the link device node 110c is in communication with the end device nodes 115e and 115f. The group Gn has the link device nodes 110d and 110e in communication with the gateway device 105. The link device node 110d is in communication with the end device nodes 115g and 115h. The link device node 110e is in communication with the link device node 110i.

The end device nodes 115a, 115e, 115f, and 115i and the link device nodes 110b, 110c, and 110e communicate on the frequency channel $B_1$. The end device node 115b communicates on the frequency channel $B_2$. The end device node 115d communicate on the frequency channel $B_k$. The end device nodes 115g and 115h and the link device node 110d communicate on the frequency channel $B_m$.

Figure 17B:
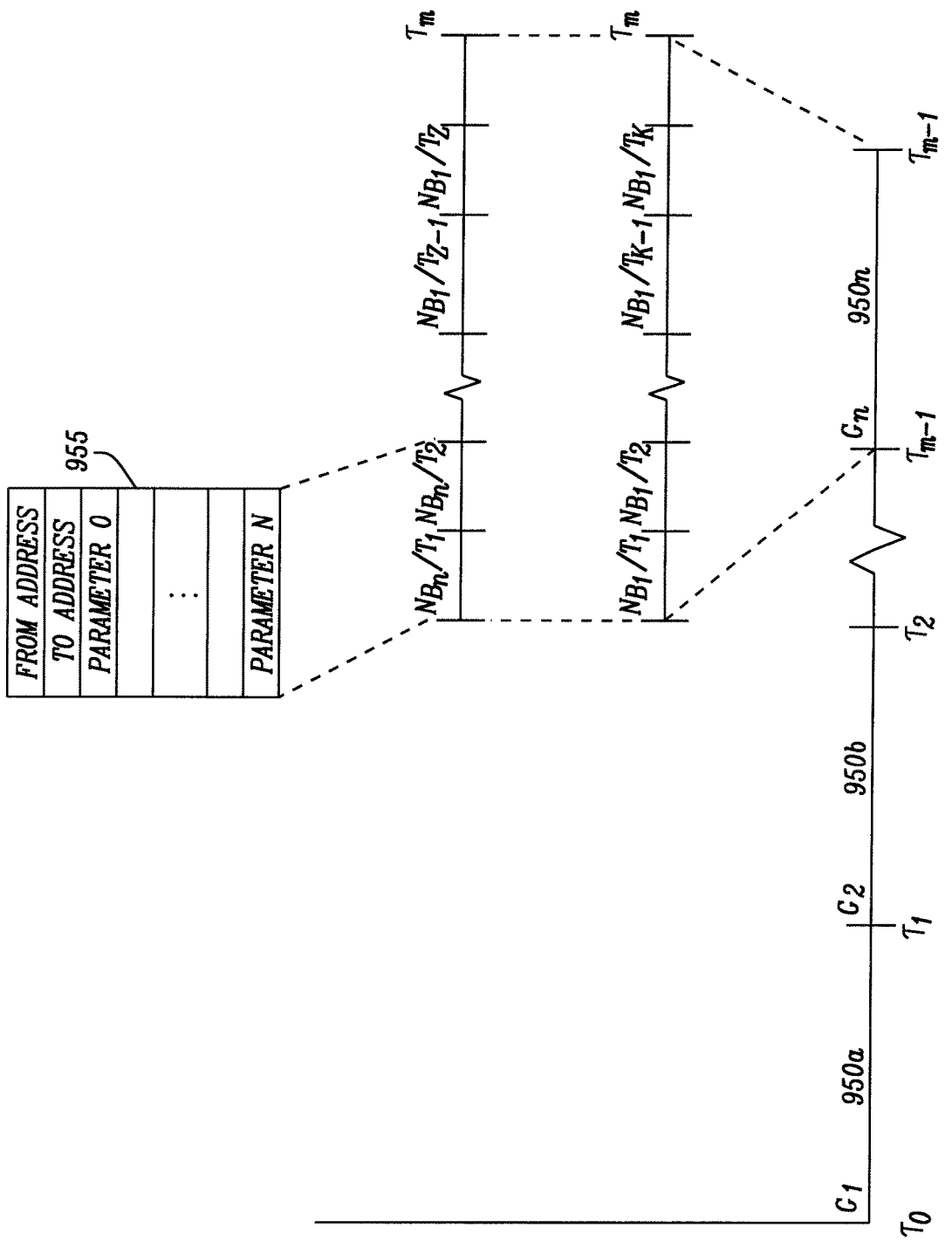
FIG. 17B is a plot of the timeslots of a channel on which designated nodes of the groups of the family tree structure of the mesh-tree structure of the narrow-band wireless network of this disclosure are transmitting.

FIG. 17B is a plot of the timeslots of a channel $B_1$, $B_2$, $B_3$, ... $B_k$, ... $B_m$, on which designated nodes of the groups of the family tree structure of FIG. 14A of the mesh-tree structure of the narrow-band wireless network of this disclosure are transmitting and receiving. Each group G1, G1, ... Gn is allocated a group timeslots in this example are Group G1 sending data during $\tau_0 < \tau < \tau_1$, Group G2 sends data during $\tau_1 < \tau < \tau_2$, Group Gn sends data during $\tau_{m-1} < \tau < \tau_m$. Each one of the group timeslots 950a, 950b, ..., 950m is divided into message timeslots $N_1, N_2, N_3, ..., N_{m-1}, N_m$. Each of the message timeslots $N_1, N_2, N_3, ..., N_{m-1}, N_m$ contains a message 955 that has a message type of one byte; an identification code for the device node transmitting data; an originating address of the transmitting device node; the destination address of the linking device node or the gateway device receiving the transmitted data of four bytes; a command code defining the purpose of the message; and the payload of the parameters of the message. The physical structure of the message 955 is defined by the required structure of the application.

The installation and maintenance of a complete network for large numbers of device nodes and their sensors such as power meters usually require a technical specialist with a lot of field work experience. A network of sensors having the network device nodes of the mesh tree network of this disclosure can quickly and easily be networked. The network protocol of the mesh tree network of this disclosure provides reliable connectivity to far-off or hard to reach device nodes by enabling any device nodes closer to the gateway device to act as a repeater. The mesh-tree network of this disclosure is structured to make the installation of the device nodes easy and quick. No staging phase or configuration in the area of the installation is needed, and personnel with basic technical training can do the job easily. All device node data are available through an application programming interface (API) and as the network management is done entirely in the cloud server and therefore requires the minimal need for onsite maintenance.

Figure 18A:
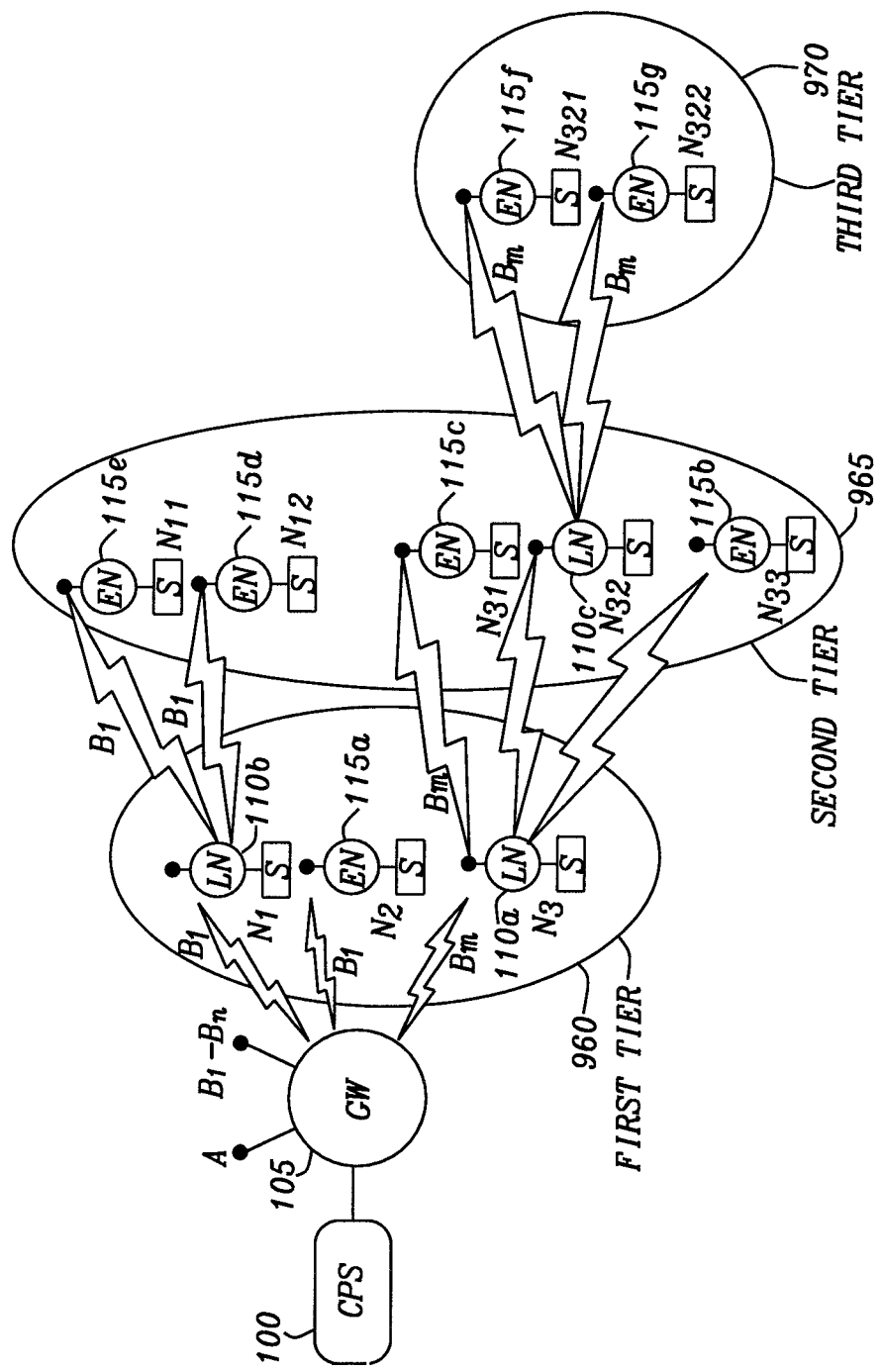
FIG. 18A is a diagram of a node tier structure of the mesh-tree structure of the narrow-band wireless network of this disclosure.

FIG. 18A is a diagram of a node tier structure of the mesh-tree structure of the narrow-band wireless network of this disclosure. The tree structure of the mesh-tree narrow-band wireless network is divided into tiers: tier 1 960, tier 2 965, tier 3 970. The first tier 960 has a link device node 110*a* and a link device node 110*b* in communication with the gateway device 105. Further, the first tier 960 has the end device node 115*a* that is also connected with the gateway device 105. The link device node 110*b* is designated node N1; the end device node 115*a* is designated node N2; and the link device node 110*a* is designated node N3. The link device node 110*a* and the end device node 115*a* communicate on the channel $B_1$ and the link node 110*b* communicates on channel $B_1$.

The second tier 965 has a link device node 110*c* that is in communication with link device node 110*b*. The second tier 965 has an end device node 115*b* and end device node 115*c* communicating with the link device node 110*a*, Further, the second tier 965 has an end device node 115*d* and end device node 115*e* communicating with the link device node 110*b*, The end device node 115*e* is designated node N11; the end device node 115*f* is designated node N12; the end device node 115*c* is designated node N31; link device node 110*c* is designated node N32; and the end device node 115*b* is designated node N33. The end nodes 110*d* and 110*e* communicate on channel $B_1$. The link node 110*c* and the end nodes 115*b* and 115*c* communicate on channel $B_m$.

Figure 18B:
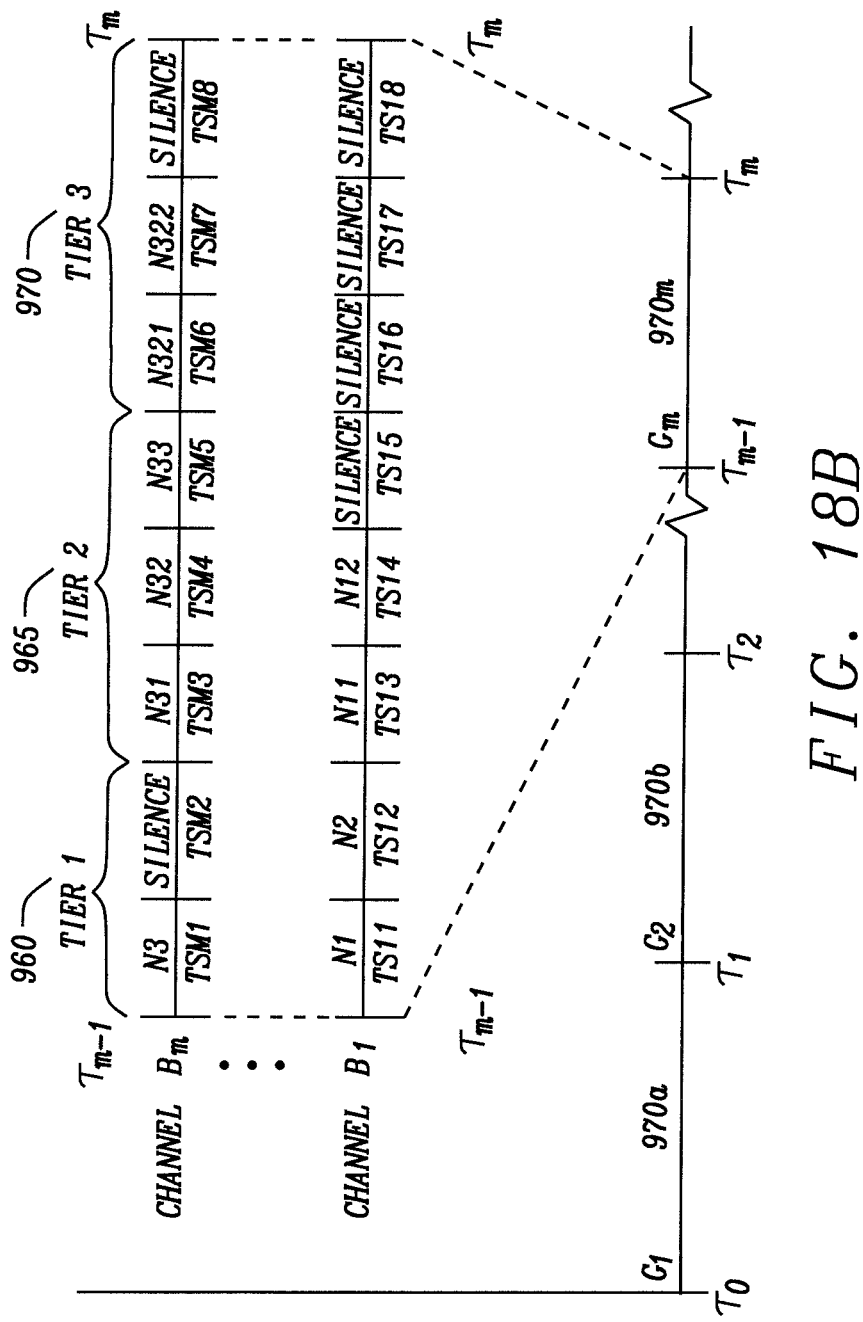
FIG. 18B is a plot of the timeslots of a channel on which designated nodes of the tiers of nodes of the mesh-tree structure of the narrow-band wireless network of this disclosure are transmitting.

The third tier 970 has an end device node 115*f* and end device node 115*g* communicating with the link device node 110*c*, The end device node 115*e* is designated node N321; the end device node 115*f* is designated node N322. The end device nodes FIG. 18B is a plot of the timeslots of a channel $B_1$, $B_2$, $B_3$, ... $B_k$, ... $B_m$ on which designated nodes of the tiers 960, 965, 970 of nodes of the mesh-tree structure of the narrow1band wireless network of this disclosure are transmitting. Each group G1, G1, ... Gn is allocated a group timeslots in this example are Group G1 sending data during $\tau_0 < \tau < \tau_1$, Group G2 sends data during $\tau_1 < \tau < \tau_2$, Group Gm sends data during $\tau_{m-1} < \tau < \tau_m$. Each one of the group timeslots 970*a*, 970*b*, ... , 970*m* is divided into message timeslots TS11, TS12 ... , TS17, TS18, TSM1, TSM2 ... , TSM7, TSM8. Please, note that the number of timeslots is not limited to 1-8 as shown and may any number. The illustration is exemplary.

Each of the message timeslots TS11, TS12 ... , TS17, TS18, TSM1, TSM2 ... , TSM7, TSM8 are assigned to the device nodes in tier order. The parent device node assigns the child device nodes to the timeslots TS11, TS12 ... , TS17, TS18, TSM1, TSM2 ... , TSM7, TSM8. If a child device node is assigned a different channel, the timeslots TS11, TS12 ... , TS17, TS18, TSM1, TSM2 ... , TSM7, TSM8 would be identical to the timeslot TS11, TS12 ... , TS17, TS18, TSM1, TSM2 ... , TSM7, TSM8 assigned if the child device node was assigned the same channel as the parent device node. Within a reporting session, all device nodes in the first tier (direct children to the gateway) respond to communication requests first. Thereafter, each link device node is requested in turn (according to some scheme, e.g. by using their regular timeslot designation) to report their own direct descendants' data. Each child device node has a timeslot TS11, TS12 ... , TS17, TS18, TSM1, TSM2 ... , TSM7, TSM8 that with respect to their direct parent—i.e. the time slot number will be identical relative to other child device nodes. The timeslot reporting order if all the link device nodes 110*a*, 110*b*, 110*c* and end device nodes 115*a*, 115*b*, ... , 115*g* share a single channel $B_m$, is: (N1-N2-N3) tier 1-(N11-N12-N31-N32-N33) tier 2-(N321-N322) tier 3.

As shown in FIG. 18B, there are two channels, $B_1$ and $B_m$ are used. The device nodes (N1, N2, N11, and N12) assigned to channel $B_1$ are assigned to the timeslots TS11, TS12 TS13, and TS14. The remaining timeslots TS15, ... , TS17, TS18 have no nodes assigned and the channel $B_1$ has no transmission and remains silent. The device nodes (N3, N31, N32, N33, N321, N322) assigned to channel $B_m$ are assigned to the timeslots TS11, TS13, TS14, TS15, TS16, TS17 and. The remaining timeslots TS12 and TS18 have no nodes assigned and the channel $B_m$ has no transmission in these timeslots and remains silent. The central provisioning server 100 waits until all link device nodes and all end device nodes within each tier, tier 1 960, tier 2 965, and tier 3 970 have reported before the next tier, tier 1 960, tier 2 965, and tier 3 970 begins to report.

While this disclosure has been particularly shown and described with reference to the preferred embodiments thereof, it will be understood by those skilled in the art that various changes in form and details may be made without departing from the spirit and scope of the disclosure.

What is claimed is:

1. A method for forming a narrow-band wireless data network comprising the steps of:
   providing a central provisioning server that executes the steps of:
   providing command and control data to the narrowband wireless data network,
   retaining a mesh-tree structure of the narrow-band wireless data network,
   managing and retaining all sensor data, and
   managing and responding to new connection requests; and
   providing a gateway device by the steps of
   providing a first radio receiver/transmitter configured for sending commands and control messages on at least one command and control frequency channel;
   providing a second radio receiver/transmitter configured for simultaneously receiving data on one or more response frequency channels; and
   connecting the gateway device to the central provisioning server comprising:
   configuring the gateway device for generating command and control messages, and
   configuring the gateway device for decoding response and data messages received from the narrow-band wireless data network;
   providing a plurality of device nodes by the steps of:
   controlling and communicating with an associated sensor device for retrieving and retaining sensor data,
   transmitting sensor data through the narrow-band wireless data network on one assigned response frequency channel to the gateway device and thus to the central provisioning server,
   operating in one command and control frequency channel at any one timeslot,
   interpreting commands transmitted from the gateway device or other device nodes on the network.

2. The method for forming a narrow-band wireless data network of claim 1 wherein one or more of the plurality of device nodes is a link device node and the remainder of device nodes are end device nodes, wherein the link device node communicates with one or more of the end device nodes.

3. The method for forming a narrow-band wireless data network of claim 1 wherein the central provisioning server commands the gateway device to broadcast a join query inquiring if any new device nodes are present on the network.

4. The method for forming a narrow-band wireless data network of claim 3 wherein a newly added device node and associated sensor responds to the join new query response that includes the device node's identification code.

5. The method for forming a narrow-band wireless data network of claim 4 wherein the central provisioning server commands the gateway device to broadcast a join new message containing a parent identification code, the device node identification code, an assigned frequency channel, and a timeslot within the assigned frequency channel for transmission.

6. The method for forming a narrow-band wireless data network of claim 5 wherein there is no acknowledgment of the join new message.

7. The method for forming a narrow-band wireless data network of claim 1 wherein at any time the central provisioning server commands the gateway device to broadcast a flagged join query with a device node address requesting a device node status of a particular device node, and wherein all linked device nodes rebroadcast the flagged join query and only the addressed end device node responds to the flagged join query with its parent identification code and its own identification code and all other device nodes in the network ignore the broadcasted join query.

8. The method for forming a narrow-band wireless data network of claim 1 wherein when the central provisioning server requires sensor data, the central provisioning server commands the gateway device to broadcast a prepare data command and send the data command to the link device nodes and the end device nodes.

9. The method for forming a narrow-band wireless data network of claim 8 wherein the link device nodes and the end device nodes retrieve the sensor data from the sensor or the device node memory, generate a data message, and transmit the data message directly to the gateway device or through one or more link device nodes to the gateway device.

10. The method for forming a narrow-band wireless data network of claim 9 wherein the prepare data command and send the data command are transmitted on the command and control frequency channel and the data message is transmitted on the assigned response frequency channel in an assigned timeslot.

11. The method for forming a narrow-band wireless data network of claim 3 wherein when any new device node is out of range of the gateway device that the new device node can receive the new device query transmission, the end device nodes that exist in the network retransmit the new device query transmission and the new node receives the new device query transmission and transmit its identification code.

12. The method for forming a narrow-band wireless data network of claim 3 wherein least one of the end device nodes transmit a parent identification code, a timeslot designation, and a channel designation to the new device and the end node designates itself a link device node and transmit a child listing to the gateway device and thus to the central provisioning server.

13. The method for forming a narrow-band wireless data network of claim 3 further comprising the steps of:
determining if any new device node is within range of a gateway device to receive a new device query transmission;
joining by the new device node to the narrow-band wireless data network through the gateway device, when the new device node is within range of the gateway device;
joining autonomously the new device node the narrow-band wireless data network via one of the at least one of the end device nodes or at least one of the link device nodes, when any new device node is out of range of the gateway device that the new device node can receive the new device query transmission from the gateway.

14. The method for forming a narrow-band wireless data network of claim 13 further comprising the steps of:
applying power to any new device node;
listening by any new device node for a new device join query from the gateway device for a set time;
transmitting by the new device a request to join query signal for informing nearby at least one of the end device nodes or at least one of the link device nodes that the new device is available for joining the network when the new device has not received the new device join query for the set time,
receiving by any of the at least one of the end device nodes or at least one of the link device nodes the request to join query signal;
transmitting an answer message by any of the at least one of the end device nodes or at least one of the link device nodes that received the request to join query signal to inform the new device node that there is an at least one of the end device nodes or at least one of the link device nodes within range;
receiving the answer message by the new device node;
registering by the new device node with the first end device node or link device of the at least one of the end device nodes or at least one of the link device nodes that responds to the request to join query signal received by the new device node.

15. The method for forming a narrow-band wireless data network of claim 14 further comprising the step of:
discarding all subsequent answer messages that the new device receives from at least one of the end device nodes or at least one of the link device nodes.

16. The method for forming a narrow-band wireless data network of claim 15 further comprising the step of
setting a link flag indicating the one end device node of the at least one of the end device nodes to which the new device node has joined indicating that it registered as one of the link device nodes.

17. An apparatus comprising means for configuring and operating a narrow-band wireless data network wherein the means comprise:
means for providing a central provisioning server;
means for providing a gateway device;
means for providing a plurality of device nodes
wherein the means for providing the central provisioning server comprise:
means for providing command and control data to the wireless data network,
non-transitory memory means for retaining a mesh-tree structure data of the narrow-band wireless data network,
means for performing a sensor data query, means for receiving sensor data from the narrow-band wireless data network, means for transferring the sensor data to a sensor data database located in a cloud storage pool, and
means for managing and responding to new connection requests;

wherein the means for providing the gateway device comprises:
   means for providing a first radio receiver/transmitter configured for sending commands and control messages on at least one command and control frequency channel;
   means for providing a second radio receiver/transmitter configured for simultaneously receiving data on one or more response frequency channels; and
   means for connecting the gateway device to the central provisioning server comprising:
      means for connecting the gateway device to the central provisioning server comprising:
         means for configuring the gateway device for generating command and control messages, and
         means for configuring the gateway device for decoding response and data messages received from the narrow-band wireless data network;
wherein the means for providing the central provisioning server generates a command for the gateway device to broadcast a join query inquiring if any new device nodes are present on the narrow-band wireless data network;
wherein means for providing a plurality of device nodes generates a command that the plurality of device nodes generate a response command such that a newly added device node and associated sensor respond to the join query with the device node's identification code;
wherein the means for providing the central provisioning server generates a command for the means for providing the gateway device to generate and broadcast a join new message containing a parent identification code, the device node identification code, an assigned frequency channel, and a timeslot within the assigned frequency channel for transmission;
wherein the means for providing a plurality of device nodes generates a command for setting a flag register as joined to the narrow-band wireless data network by the newly added device node and discarding any further join new messages; and
wherein the means for providing a plurality of device nodes generates a command for not transmitting by the newly added device node any acknowledgment of the join new messages.

18. The apparatus of claim 17 wherein:
the means for providing the central provisioning server generates a command that the gateway device broadcast a flagged join query with a device node address requesting a device node status of a particular device node;
the means for providing a plurality of device nodes generates a command for rebroadcasting by all linked device nodes the flagged join query;
the means for providing a plurality of device nodes generates a command for responding by only the addressed device node to the flagged join query with its parent identification code and its own identification code; and
the means for providing a plurality of device nodes generates a command for ignoring by all other device nodes in the narrow-band wireless data network the broadcasted flagged join query.

19. The apparatus of claim 18 further wherein:
the means for providing the central provisioning server generates a command for instructing the gateway device broadcast a prepare data command and a send data command to link device nodes and end device nodes when the central provisioning server requires sensor data;
means for providing a plurality of device nodes generate a command for retrieving the sensor data by the link device nodes and the end device nodes from the sensor or the device node memory;
means for providing a plurality of device nodes generate a command within each device node for generating a data message, and
means for providing a plurality of device nodes generate a command within each device node for transmitting the data message directly to the gateway device or through one or more link device nodes to the gateway device.

20. The apparatus of claim 19 wherein the prepare data command and send data command are transmitted on the command and control frequency channel and the data message is transmitted on the assigned response frequency channel in an assigned timeslot.

21. The apparatus of claim 20 wherein when any new device node out of range of the gateway device to receive the new device query transmission, the end device nodes that exist in the network retransmit the new device query transmission and the new node receives the new device query transmission and transmit its identification code.

22. The apparatus of claim 21 wherein the means for providing a plurality of device nodes generates a command for the end device node to transmit a parent identification code, a timeslot designation, and a channel designation to the new device and the means for providing a plurality of device nodes generates a command for the end node to designate itself a link device node and to transmit a child listing to the gateway device and thus to the central provisioning server.

23. The apparatus of claim 17 wherein the means for providing a plurality of device nodes generates a command for autonomously joining the new device node to the narrow-band wireless data network via one of the at least one of the end device nodes or at least one of the link device nodes when any new device node is out of range of the gateway device that the new device node can receive the new device query transmission from the gateway.

24. The apparatus of claim 23 wherein:
the means for providing a plurality of device nodes generates a command for applying power to any new device node;
the means for providing a plurality of device nodes generates a command for listening by any new device node for a new device join query from the gateway device for a set time;
the means for providing a plurality of device nodes generates a command for transmitting by the new device a request to join query signal for informing nearby at least one of the end device nodes or at least one of the link device nodes that the new device is available for joining the network when the new device has not received the new device join query for the set time;
the means for providing a plurality of device nodes generates a command for receiving the request to join query signal by any of the at least one of the end device nodes or at least one of the link device nodes;
the means for providing a plurality of device nodes generates a command for transmitting an answer message by any of the at least one of the end device nodes or at least one of the link device nodes that received the request to join query signal to inform the new device node that there is an at least one of the end device nodes or at least one of the link device nodes within range;

the means for providing a plurality of device nodes generates a command for receiving the answer message by the new device node;

the means for providing a plurality of device nodes generates a command for registering by the new device node with the first end device node or link device of the at least one of the end device nodes or at least one of the link device nodes that responds to the request to join query signal received by the new device node.

25. The apparatus of claim 24 wherein the means for providing a plurality of device nodes generates a command for discarding all subsequent answer messages that the new device receives from at least one of the end device nodes or at least one of the link device nodes.

26. The apparatus of claim 25 wherein the means for providing a plurality of device nodes generates a command for setting a link flag indicating the one end device node of the at least one of the end device nodes to which the new device node has joined indicating that it registered as one of the link device nodes.

\* \* \* \* \*